US011240961B2

(12) United States Patent
Anderson et al.

(10) Patent No.: US 11,240,961 B2
(45) Date of Patent: Feb. 8, 2022

(54) CONTROLLING A HARVESTING MACHINE BASED ON A GEO-SPATIAL REPRESENTATION INDICATING WHERE THE HARVESTING MACHINE IS LIKELY TO REACH CAPACITY

(71) Applicant: Deere & Company, Moline, IL (US)

(72) Inventors: Noel W. Anderson, Fargo, ND (US); Benjamin M. Smith, Falls Church, VA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 16/171,978

(22) Filed: Oct. 26, 2018

(65) Prior Publication Data

US 2020/0128737 A1    Apr. 30, 2020

(51) Int. Cl.
| | | |
|---|---|---|
| *A01D 41/127* | (2006.01) | |
| *A01B 69/04* | (2006.01) | |
| *A01D 91/04* | (2006.01) | |
| *G05D 1/02* | (2020.01) | |
| *A01D 90/10* | (2006.01) | |

(52) U.S. Cl.
CPC ........ *A01D 41/1275* (2013.01); *A01B 69/008* (2013.01); *A01D 91/04* (2013.01); *G05D 1/0212* (2013.01); *A01D 90/10* (2013.01); *G05D 2201/0201* (2013.01)

(58) Field of Classification Search
CPC .... A01D 41/1275; A01D 91/04; A01D 90/10; A01B 69/008; G05D 1/0212; G05D 2201/0201
USPC .......................................................... 701/50
See application file for complete search history.

(56) References Cited

U.S. PATENT DOCUMENTS

| | | |
|---|---|---|
| 3,568,157 A | 3/1971 | Downing et al. |
| 3,580,257 A | 5/1971 | Teague |
| 3,599,543 A | 8/1971 | Kerridge |
| 3,775,019 A | 11/1973 | Konig et al. |
| 3,856,754 A | 12/1974 | Habermeier et al. |
| 4,129,573 A | 12/1978 | Bellus et al. |
| 4,166,735 A | 9/1979 | Pilgram et al. |

(Continued)

FOREIGN PATENT DOCUMENTS

| | | |
|---|---|---|
| AR | 108898 A1 | 10/2018 |
| AU | 20100224431 A1 | 4/2011 |

(Continued)

OTHER PUBLICATIONS

Mei-Ju et al., "Two paradigms in cellular Internet-of-Things access for energy-harvesting machine-to-machine devices: push-based versus pull-based," 2016, vol. 6.*

(Continued)

*Primary Examiner* — Tuan C To
(74) *Attorney, Agent, or Firm* — Joseph R. Kelly; Kelly, Holt & Christenson PLLC

(57) ABSTRACT

A georeferenced probability distribution is generated indicating a probability that a harvester will reach its full capacity at different locations in a field. A control signal is generated to control the harvester based upon the georeferenced probability distribution. The control signal is used to control one of a plurality of different controllable subsystems, such as the propulsion system (to control harvester speed), a steering subsystem (to control the harvester's path), or other controllable subsystems.

21 Claims, 12 Drawing Sheets

(56) References Cited

U.S. PATENT DOCUMENTS

| | | | |
|---|---|---|---|
| 4,183,742 A | 1/1980 | Sasse et al. |
| 4,268,679 A | 5/1981 | Lavanish |
| 4,349,377 A | 9/1982 | Durr et al. |
| 4,360,677 A | 11/1982 | Doweyko et al. |
| 4,435,203 A | 3/1984 | Funaki et al. |
| 4,493,726 A | 1/1985 | Burdeska et al. |
| 4,527,241 A | 7/1985 | Sheehan et al. |
| 4,566,901 A | 1/1986 | Martin et al. |
| 4,584,013 A | 4/1986 | Brunner |
| 4,687,505 A | 8/1987 | Sylling et al. |
| 4,857,101 A | 8/1989 | Musco et al. |
| 4,911,751 A | 3/1990 | Nyffeler et al. |
| 5,059,154 A | 10/1991 | Reyenga |
| 5,089,043 A | 2/1992 | Hayase et al. |
| 5,246,164 A | 9/1993 | McCann |
| 5,246,915 A | 9/1993 | Lutz et al. |
| 5,250,690 A | 10/1993 | Turner et al. |
| 5,296,702 A | 3/1994 | Beck et al. |
| 5,300,477 A | 4/1994 | Tice |
| 5,416,061 A | 5/1995 | Hewett et al. |
| 5,477,459 A * | 12/1995 | Clegg ............... G01C 15/002 356/152.1 |
| 5,488,817 A * | 2/1996 | Paquet ............... A01D 41/127 56/10.2 R |
| 5,563,112 A | 10/1996 | Barnes, III |
| 5,585,626 A | 12/1996 | Beck et al. |
| 5,586,033 A | 12/1996 | Hall |
| 5,592,606 A | 1/1997 | Myers |
| 5,606,821 A | 3/1997 | Sadjadi et al. |
| 5,666,793 A | 9/1997 | Bottinger |
| 5,712,782 A | 1/1998 | Weigelt et al. |
| 5,721,679 A | 2/1998 | Monson |
| 5,767,373 A | 6/1998 | Ward et al. |
| 5,771,169 A | 6/1998 | Wendte |
| 5,789,741 A | 8/1998 | Kinter et al. |
| 5,809,440 A | 9/1998 | Beck et al. |
| 5,841,282 A | 11/1998 | Christy |
| 5,849,665 A | 12/1998 | Gut et al. |
| 5,878,821 A | 3/1999 | Flenker |
| 5,899,950 A | 5/1999 | Milender et al. |
| 5,902,343 A | 5/1999 | Hale et al. |
| 5,915,492 A | 6/1999 | Yates et al. |
| 5,957,304 A | 9/1999 | Dawson |
| 5,959,154 A | 9/1999 | Sioli |
| 5,974,348 A | 10/1999 | Rocks |
| 5,978,723 A | 11/1999 | Hale et al. |
| 5,991,687 A | 11/1999 | Hale et al. |
| 5,991,694 A | 11/1999 | Gudat et al. |
| 5,995,894 A | 11/1999 | Wendte |
| 5,995,895 A | 11/1999 | Watt et al. |
| 6,004,076 A | 12/1999 | Cook et al. |
| 6,016,713 A | 1/2000 | Hale |
| 6,029,106 A | 2/2000 | Hale et al. |
| 6,041,582 A | 3/2000 | Tiede et al. |
| 6,073,070 A | 6/2000 | Diekhans |
| 6,073,428 A | 6/2000 | Diekhans |
| 6,085,135 A | 7/2000 | Steckel |
| 6,119,442 A | 9/2000 | Hale |
| 6,119,531 A | 9/2000 | Wendte et al. |
| 6,128,574 A | 10/2000 | Diekhans |
| 6,141,614 A | 10/2000 | Janzen et al. |
| 6,185,990 B1 | 2/2001 | Missotten et al. |
| 6,188,942 B1 | 2/2001 | Corcoran et al. |
| 6,199,000 B1 | 3/2001 | Keller et al. |
| 6,204,856 B1 | 3/2001 | Wood et al. |
| 6,205,381 B1 | 3/2001 | Motz et al. |
| 6,205,384 B1 | 3/2001 | Diekhans |
| 6,216,071 B1 | 4/2001 | Motz |
| 6,236,924 B1 | 5/2001 | Motz et al. |
| 6,272,819 B1 | 8/2001 | Wendte et al. |
| 6,327,569 B1 | 12/2001 | Reep |
| 6,374,173 B1 | 4/2002 | Ehlbeck |
| 6,380,745 B1 | 4/2002 | Anderson |
| 6,431,790 B1 | 8/2002 | Anderegg et al. |
| 6,451,733 B1 | 9/2002 | Pidskalny et al. |
| 6,505,146 B1 | 1/2003 | Blackmer |
| 6,505,998 B1 | 1/2003 | Bullivant |
| 6,539,102 B1 | 3/2003 | Anderson et al. |
| 6,549,849 B2 | 4/2003 | Lange et al. |
| 6,584,390 B2 | 6/2003 | Beck |
| 6,591,145 B1 | 7/2003 | Hoskinson et al. |
| 6,592,453 B2 | 7/2003 | Coers et al. |
| 6,604,432 B1 | 8/2003 | Hamblen et al. |
| 6,682,416 B2 | 1/2004 | Behnke et al. |
| 6,687,616 B1 | 2/2004 | Peterson et al. |
| 6,729,189 B2 | 5/2004 | Paakkinen |
| 6,735,568 B1 | 5/2004 | Buckwalter et al. |
| 6,834,550 B2 | 12/2004 | Upadhyaya et al. |
| 6,838,564 B2 | 1/2005 | Edmunds et al. |
| 6,846,128 B2 | 1/2005 | Sick |
| 6,932,554 B2 | 8/2005 | Isfort et al. |
| 6,999,877 B1 | 2/2006 | Dyer et al. |
| 7,073,374 B2 | 7/2006 | Berkman |
| 7,167,797 B2 | 1/2007 | Faivre et al. |
| 7,167,800 B2 | 1/2007 | Faivre et al. |
| 7,191,062 B2 | 3/2007 | Chi et al. |
| 7,194,965 B2 | 3/2007 | Hickey et al. |
| 7,211,994 B1 * | 5/2007 | Mergen ............... G01R 29/0842 324/528 |
| 7,248,968 B2 | 7/2007 | Reid |
| 7,255,016 B2 | 8/2007 | Burton |
| 7,261,632 B2 | 8/2007 | Pirro et al. |
| 7,302,837 B2 | 12/2007 | Wendte |
| 7,308,326 B2 | 12/2007 | Maertens et al. |
| 7,313,478 B1 | 12/2007 | Anderson et al. |
| 7,318,010 B2 | 1/2008 | Anderson |
| 7,347,168 B2 | 3/2008 | Reckels et al. |
| 7,408,145 B2 | 8/2008 | Holland |
| 7,480,564 B2 | 1/2009 | Metzler et al. |
| 7,483,791 B2 | 1/2009 | Anderegg et al. |
| 7,537,519 B2 | 5/2009 | Huster et al. |
| 7,557,066 B2 | 7/2009 | Hills et al. |
| 7,628,059 B1 | 12/2009 | Scherbring |
| 7,687,435 B2 | 3/2010 | Witschel et al. |
| 7,703,036 B2 | 4/2010 | Satterfield et al. |
| 7,725,233 B2 | 5/2010 | Hendrickson et al. |
| 7,733,416 B2 | 6/2010 | Gal |
| 7,756,624 B2 | 7/2010 | Diekhans et al. |
| 7,798,894 B2 | 9/2010 | Isfort |
| 7,827,042 B2 | 11/2010 | Jung et al. |
| 7,915,200 B2 | 3/2011 | Epp et al. |
| 7,945,364 B2 | 5/2011 | Schricker et al. |
| 7,993,188 B2 | 8/2011 | Ritter |
| 8,024,074 B2 | 9/2011 | Stelford et al. |
| 8,060,283 B2 | 11/2011 | Mott et al. |
| 8,107,681 B2 | 1/2012 | Gaal |
| 8,145,393 B2 | 3/2012 | Foster et al. |
| 8,147,176 B2 | 4/2012 | Coers et al. |
| 8,152,610 B2 | 4/2012 | Harrington |
| 8,190,335 B2 | 5/2012 | Vik et al. |
| 8,195,342 B2 | 6/2012 | Anderson |
| 8,195,358 B2 | 6/2012 | Anderson |
| 8,213,964 B2 | 7/2012 | Fitzner et al. |
| 8,224,500 B2 | 7/2012 | Anderson |
| 8,252,723 B2 | 8/2012 | Jakobi et al. |
| 8,254,351 B2 | 8/2012 | Fitzner et al. |
| 8,321,365 B2 | 11/2012 | Anderson |
| 8,329,717 B2 | 12/2012 | Minn et al. |
| 8,332,105 B2 | 12/2012 | Laux |
| 8,338,332 B1 | 12/2012 | Hacker et al. |
| 8,340,862 B2 | 12/2012 | Baumgarten et al. |
| 8,407,157 B2 | 3/2013 | Anderson |
| 8,428,829 B2 | 4/2013 | Brunnert et al. |
| 8,478,493 B2 | 7/2013 | Anderson |
| 8,494,727 B2 | 7/2013 | Green et al. |
| 8,527,157 B2 | 9/2013 | Imhof et al. |
| 8,544,397 B2 | 10/2013 | Bassett |
| 8,577,561 B2 | 11/2013 | Green et al. |
| 8,606,454 B2 | 12/2013 | Wang et al. |
| 8,626,406 B2 | 1/2014 | Schleicher et al. |
| 8,635,903 B2 | 1/2014 | Oetken et al. |
| 8,649,940 B2 | 2/2014 | Bonefas |
| 8,656,693 B2 | 2/2014 | Madsen et al. |
| 8,662,972 B2 | 3/2014 | Behnke et al. |

(56) References Cited

U.S. PATENT DOCUMENTS

| | | |
|---|---|---|
| 8,671,760 B2 | 3/2014 | Wallrath et al. |
| 8,677,724 B2* | 3/2014 | Chaney .............. A01F 15/0833 |
| | | 56/341 |
| 8,738,238 B2 | 5/2014 | Rekow |
| 8,738,244 B2 | 5/2014 | Lenz et al. |
| 8,755,976 B2 | 6/2014 | Peters et al. |
| 8,781,692 B2 | 7/2014 | Kormann |
| 8,789,563 B2 | 7/2014 | Wenzel |
| 8,814,640 B2 | 8/2014 | Behnke et al. |
| 8,843,269 B2 | 9/2014 | Anderson et al. |
| 8,868,304 B2 | 10/2014 | Bonefas |
| 8,909,389 B2 | 12/2014 | Meyer |
| D721,740 S | 1/2015 | Schmaltz et al. |
| 8,942,860 B2 | 1/2015 | Morselli |
| 8,962,523 B2 | 2/2015 | Rosinger et al. |
| 9,002,591 B2 | 4/2015 | Wang et al. |
| 9,008,918 B2 | 4/2015 | Missotten et al. |
| 9,009,087 B1 | 4/2015 | Mewes et al. |
| 9,011,222 B2* | 4/2015 | Johnson ................ A01D 91/04 |
| | | 460/1 |
| 9,014,901 B2 | 4/2015 | Wang et al. |
| 9,043,096 B2* | 5/2015 | Zielke ................ A01D 41/127 |
| | | 701/50 |
| 9,043,129 B2 | 5/2015 | Bonefas et al. |
| 9,066,465 B2 | 6/2015 | Hendrickson et al. |
| 9,072,227 B2 | 7/2015 | Wenzel |
| 9,095,090 B2 | 8/2015 | Casper et al. |
| 9,119,342 B2 | 9/2015 | Bonefas |
| 9,127,428 B2 | 9/2015 | Meier |
| 9,131,644 B2 | 9/2015 | Osborne |
| 9,152,938 B2 | 10/2015 | Lang et al. |
| 9,173,339 B2 | 11/2015 | Sauder et al. |
| 9,188,518 B2 | 11/2015 | Snyder et al. |
| 9,188,986 B2 | 11/2015 | Baumann |
| 9,226,449 B2 | 1/2016 | Bischoff |
| 9,234,317 B2 | 1/2016 | Chi |
| 9,235,214 B2 | 1/2016 | Anderson |
| 9,301,447 B2 | 4/2016 | Kormann |
| 9,301,466 B2 | 4/2016 | Kelly |
| 9,313,951 B2 | 4/2016 | Herman et al. |
| 9,326,443 B2 | 5/2016 | Zametzer et al. |
| 9,326,444 B2 | 5/2016 | Bonefas |
| 9,392,746 B2 | 7/2016 | Darr et al. |
| 9,405,039 B2 | 8/2016 | Anderson |
| 9,410,840 B2 | 8/2016 | Acheson et al. |
| 9,439,342 B2 | 9/2016 | Pasquier |
| 9,457,971 B2 | 10/2016 | Bonefas et al. |
| 9,463,939 B2 | 10/2016 | Bonefas et al. |
| 9,485,905 B2 | 11/2016 | Jung et al. |
| 9,489,576 B2 | 11/2016 | Johnson et al. |
| 9,497,898 B2 | 11/2016 | Dillon |
| 9,510,508 B2 | 12/2016 | Jung |
| 9,511,633 B2 | 12/2016 | Anderson et al. |
| 9,511,958 B2 | 12/2016 | Bonefas |
| 9,516,812 B2 | 12/2016 | Baumgarten et al. |
| 9,521,805 B2 | 12/2016 | Muench et al. |
| 9,522,791 B2 | 12/2016 | Bonefas et al. |
| 9,522,792 B2 | 12/2016 | Bonefas et al. |
| 9,523,180 B2 | 12/2016 | Deines |
| 9,529,364 B2 | 12/2016 | Foster et al. |
| 9,532,504 B2 | 1/2017 | Herman et al. |
| 9,538,714 B2 | 1/2017 | Anderson |
| 9,563,492 B2 | 2/2017 | Bell et al. |
| 9,563,848 B1 | 2/2017 | Hunt |
| 9,563,852 B1 | 2/2017 | Wiles et al. |
| 9,578,808 B2 | 2/2017 | Dybro et al. |
| 9,629,308 B2 | 4/2017 | Schler et al. |
| 9,631,964 B2 | 4/2017 | Gelinske et al. |
| 9,642,305 B2 | 5/2017 | Nykamp et al. |
| 9,648,807 B2 | 5/2017 | Escher et al. |
| 9,675,008 B1 | 6/2017 | Rusciolelli et al. |
| 9,681,605 B2 | 6/2017 | Noonan et al. |
| 9,694,712 B2 | 7/2017 | Healy |
| 9,696,162 B2 | 7/2017 | Anderson |
| 9,699,967 B2 | 7/2017 | Palla et al. |
| 9,714,856 B2 | 7/2017 | Myers |
| 9,717,178 B1 | 8/2017 | Sauder et al. |
| 9,721,181 B2 | 8/2017 | Guan et al. |
| 9,723,790 B2 | 8/2017 | Berry et al. |
| 9,740,208 B2 | 8/2017 | Sugumaran et al. |
| 9,767,521 B2 | 9/2017 | Stuber et al. |
| 9,807,934 B2 | 11/2017 | Rusciolelli et al. |
| 9,807,940 B2 | 11/2017 | Roell et al. |
| 9,810,679 B2 | 11/2017 | Kimmel |
| 9,829,364 B2 | 11/2017 | Wilson et al. |
| 9,848,528 B2 | 12/2017 | Werner et al. |
| 9,856,609 B2 | 1/2018 | Dehmel |
| 9,861,040 B2 | 1/2018 | Bonefas |
| 9,872,433 B2 | 1/2018 | Acheson et al. |
| 9,903,979 B2 | 2/2018 | Dybro et al. |
| 9,904,963 B2 | 2/2018 | Rupp et al. |
| 9,915,952 B2 | 3/2018 | Dollinger et al. |
| 9,922,405 B2 | 3/2018 | Sauder et al. |
| 9,924,636 B2 | 3/2018 | Lisouski et al. |
| 9,928,584 B2 | 3/2018 | Jens et al. |
| 9,933,787 B2 | 4/2018 | Story |
| 9,974,226 B2 | 5/2018 | Rupp et al. |
| 9,982,397 B2 | 5/2018 | Korb et al. |
| 9,984,455 B1 | 5/2018 | Fox et al. |
| 9,992,931 B2 | 6/2018 | Bonefas et al. |
| 9,992,932 B2 | 6/2018 | Bonefas et al. |
| 10,004,176 B2 | 6/2018 | Mayerle |
| 10,015,928 B2 | 7/2018 | Nykamp et al. |
| 10,019,018 B2 | 7/2018 | Hulin |
| 10,019,790 B2 | 7/2018 | Bonefas et al. |
| 10,025,983 B2 | 7/2018 | Guan et al. |
| 10,028,435 B2 | 7/2018 | Anderson et al. |
| 10,028,451 B2 | 7/2018 | Rowan et al. |
| 10,034,427 B2 | 7/2018 | Krause et al. |
| 10,039,231 B2 | 8/2018 | Anderson et al. |
| 10,064,331 B2 | 9/2018 | Bradley |
| 10,064,335 B2 | 9/2018 | Byttebier et al. |
| 10,078,890 B1 | 9/2018 | Tagestad et al. |
| 10,085,372 B2 | 10/2018 | Noyer et al. |
| 10,091,925 B2 | 10/2018 | Aharon et al. |
| 10,126,153 B2 | 11/2018 | Bischoff et al. |
| 10,129,528 B2 | 11/2018 | Bonefas et al. |
| 10,143,132 B2* | 12/2018 | Inoue ................ A01D 41/1272 |
| 10,152,035 B2 | 12/2018 | Reid et al. |
| 10,154,624 B2 | 12/2018 | Guan et al. |
| 10,165,725 B2 | 1/2019 | Sugumaran et al. |
| 10,178,823 B2 | 1/2019 | Kovach et al. |
| 10,183,667 B2 | 1/2019 | Anderson et al. |
| 10,188,037 B2 | 1/2019 | Bruns et al. |
| 10,201,121 B1 | 2/2019 | Wilson |
| 10,209,179 B2 | 2/2019 | Hollstein |
| 10,231,371 B2 | 3/2019 | Dillon |
| 10,254,147 B2 | 4/2019 | Vermue et al. |
| 10,254,765 B2 | 4/2019 | Rekow |
| 10,255,670 B1 | 4/2019 | Wu et al. |
| 10,275,550 B2 | 4/2019 | Lee |
| 10,295,703 B2 | 5/2019 | Dybro et al. |
| 10,310,455 B2 | 6/2019 | Blank et al. |
| 10,314,232 B2 | 6/2019 | Isaac et al. |
| 10,315,655 B2 | 6/2019 | Blank et al. |
| 10,317,272 B2 | 6/2019 | Bhavsar et al. |
| 10,351,364 B2 | 7/2019 | Green et al. |
| 10,368,488 B2* | 8/2019 | Becker ................ A01D 41/1275 |
| 10,398,084 B2 | 9/2019 | Ray et al. |
| 10,408,545 B2 | 9/2019 | Blank et al. |
| 10,412,889 B2 | 9/2019 | Palla et al. |
| 10,426,086 B2 | 10/2019 | Van de Wege et al. |
| 10,437,243 B2 | 10/2019 | Blank et al. |
| 10,477,756 B1 | 11/2019 | Richt et al. |
| 10,485,178 B2 | 11/2019 | Mayerle |
| 10,537,061 B2* | 1/2020 | Farley ................ G06Q 10/06 |
| 10,568,316 B2 | 2/2020 | Gall et al. |
| 10,677,637 B1 | 6/2020 | Von Muenster |
| 10,681,872 B2 | 6/2020 | Viaene et al. |
| 10,703,277 B1 | 7/2020 | Schroeder |
| 10,729,067 B2 | 8/2020 | Hammer et al. |
| 10,740,703 B2 | 8/2020 | Story |
| 10,745,868 B2 | 8/2020 | Laugwitz et al. |
| 10,760,946 B2 | 9/2020 | Meier et al. |

(56) References Cited

U.S. PATENT DOCUMENTS

| | | | |
|---|---|---|---|
| 10,809,118 B1 | 10/2020 | Von Muenster | |
| 10,830,634 B2 | 11/2020 | Blank et al. | |
| 10,866,109 B2 | 12/2020 | Madsen et al. | |
| 10,890,922 B2 | 1/2021 | Ramm et al. | |
| 10,909,368 B2 | 2/2021 | Guo et al. | |
| 10,912,249 B1 | 2/2021 | Wilson | |
| 2002/0011061 A1 | 1/2002 | Lucand et al. | |
| 2002/0083695 A1 | 7/2002 | Behnke et al. | |
| 2002/0091458 A1 | 7/2002 | Moore | |
| 2002/0099471 A1 | 7/2002 | Benneweis | |
| 2002/0133309 A1 | 9/2002 | Hardt | |
| 2002/0173893 A1 | 11/2002 | Blackmore | |
| 2002/0193928 A1 | 12/2002 | Beck | |
| 2002/0193929 A1 | 12/2002 | Beck | |
| 2002/0198654 A1 | 12/2002 | Lange | |
| 2003/0004630 A1 | 1/2003 | Beck | |
| 2003/0014171 A1 | 1/2003 | Ma | |
| 2003/0024450 A1 | 2/2003 | Juptner | |
| 2003/0060245 A1 | 3/2003 | Coers | |
| 2003/0069680 A1 | 4/2003 | Cohen et al. | |
| 2003/0075145 A1 | 4/2003 | Sheidler et al. | |
| 2003/0174207 A1 | 9/2003 | Alexia et al. | |
| 2003/0182144 A1 | 9/2003 | Pickett | |
| 2003/0187560 A1 | 10/2003 | Keller | |
| 2003/0216158 A1 | 11/2003 | Bischoff | |
| 2003/0229432 A1 | 12/2003 | Ho et al. | |
| 2003/0229433 A1 | 12/2003 | van den Berg et al. | |
| 2003/0229435 A1 | 12/2003 | Van der Lely | |
| 2004/0004544 A1 | 1/2004 | William | |
| 2004/0054457 A1 | 3/2004 | Kormann | |
| 2004/0073468 A1 | 4/2004 | Vyas et al. | |
| 2004/0193348 A1 | 9/2004 | Gray | |
| 2005/0059445 A1 | 3/2005 | Niermann | |
| 2005/0066738 A1 | 3/2005 | Moore | |
| 2005/0149235 A1 | 7/2005 | Seal et al. | |
| 2005/0150202 A1 | 7/2005 | Quick | |
| 2005/0197175 A1 | 9/2005 | Anderson | |
| 2005/0241285 A1 | 11/2005 | Maertens et al. | |
| 2005/0283314 A1 | 12/2005 | Hall | |
| 2005/0284119 A1 | 12/2005 | Brunnert | |
| 2006/0014489 A1 | 1/2006 | Fitzner et al. | |
| 2006/0014643 A1 | 1/2006 | Hacker et al. | |
| 2006/0047377 A1 | 3/2006 | Ferguson et al. | |
| 2006/0058896 A1 | 3/2006 | Pokorny et al. | |
| 2006/0074560 A1 | 4/2006 | Dyer et al. | |
| 2006/0155449 A1 | 7/2006 | Dammann | |
| 2006/0162631 A1 | 7/2006 | Hickey et al. | |
| 2006/0196158 A1 | 9/2006 | Faivre et al. | |
| 2006/0200334 A1 | 9/2006 | Faivre et al. | |
| 2007/0005209 A1 | 1/2007 | Fitzner et al. | |
| 2007/0021945 A1 | 1/2007 | Anderson | |
| 2007/0021948 A1 | 1/2007 | Anderson | |
| 2007/0056258 A1 | 3/2007 | Behnke | |
| 2007/0068238 A1 | 3/2007 | Wendte | |
| 2007/0073700 A1 | 3/2007 | Wippersteg et al. | |
| 2007/0089390 A1 | 4/2007 | Hendrickson et al. | |
| 2007/0135190 A1* | 6/2007 | Diekhans | G05D 1/0219 460/1 |
| 2007/0185749 A1 | 8/2007 | Anderson et al. | |
| 2007/0199903 A1* | 8/2007 | Denney | B01D 21/0024 210/723 |
| 2007/0208510 A1 | 9/2007 | Anderson et al. | |
| 2007/0233348 A1 | 10/2007 | Diekhans et al. | |
| 2007/0233374 A1 | 10/2007 | Diekhans et al. | |
| 2007/0239337 A1 | 10/2007 | Anderson | |
| 2007/0282523 A1 | 12/2007 | Diekhans et al. | |
| 2007/0298744 A1 | 12/2007 | Fitzner et al. | |
| 2008/0030320 A1 | 2/2008 | Wilcox et al. | |
| 2008/0098035 A1 | 4/2008 | Wippersteg et al. | |
| 2008/0140431 A1 | 6/2008 | Anderson et al. | |
| 2008/0177449 A1 | 7/2008 | Pickett et al. | |
| 2008/0248843 A1 | 10/2008 | Birrell et al. | |
| 2008/0268927 A1 | 10/2008 | Farley et al. | |
| 2008/0269052 A1 | 10/2008 | Rosinger et al. | |
| 2008/0289308 A1 | 11/2008 | Brubaker | |
| 2008/0312085 A1 | 12/2008 | Kordes et al. | |
| 2009/0044505 A1 | 2/2009 | Huster et al. | |
| 2009/0074243 A1 | 3/2009 | Missotten et al. | |
| 2009/0143941 A1* | 6/2009 | Tarasinski | A01D 41/127 701/41 |
| 2009/0192654 A1 | 7/2009 | Wendte et al. | |
| 2009/0216410 A1 | 8/2009 | Allen et al. | |
| 2009/0226036 A1 | 9/2009 | Gaal | |
| 2009/0259483 A1 | 10/2009 | Hendrickson et al. | |
| 2009/0265098 A1 | 10/2009 | Dix | |
| 2009/0306835 A1 | 12/2009 | Ellermann et al. | |
| 2009/0311084 A1 | 12/2009 | Coers et al. | |
| 2009/0312919 A1 | 12/2009 | Foster et al. | |
| 2009/0312920 A1 | 12/2009 | Boenig et al. | |
| 2009/0325658 A1* | 12/2009 | Phelan | G01F 23/0007 460/6 |
| 2010/0036696 A1 | 2/2010 | Lang et al. | |
| 2010/0042297 A1 | 2/2010 | Foster et al. | |
| 2010/0063626 A1 | 3/2010 | Anderson | |
| 2010/0063648 A1 | 3/2010 | Anderson | |
| 2010/0063651 A1 | 3/2010 | Anderson | |
| 2010/0063664 A1 | 3/2010 | Anderson | |
| 2010/0063954 A1 | 3/2010 | Anderson | |
| 2010/0070145 A1 | 3/2010 | Tomita et al. | |
| 2010/0071329 A1 | 3/2010 | Hindryckx et al. | |
| 2010/0094481 A1 | 4/2010 | Anderson | |
| 2010/0121541 A1 | 5/2010 | Behnke et al. | |
| 2010/0137373 A1 | 6/2010 | Hungenberg et al. | |
| 2010/0145572 A1 | 6/2010 | Steckel et al. | |
| 2010/0152270 A1 | 6/2010 | Suty-Heinze et al. | |
| 2010/0152943 A1 | 6/2010 | Matthews | |
| 2010/0217474 A1 | 8/2010 | Baumgarten et al. | |
| 2010/0268562 A1 | 10/2010 | Anderson | |
| 2010/0268679 A1 | 10/2010 | Anderson | |
| 2010/0285964 A1 | 11/2010 | Waldraff et al. | |
| 2010/0317517 A1 | 12/2010 | Rosinger et al. | |
| 2010/0319941 A1 | 12/2010 | Peterson | |
| 2010/0332051 A1 | 12/2010 | Kormann | |
| 2011/0056178 A1 | 3/2011 | Sauerwein et al. | |
| 2011/0059782 A1 | 3/2011 | Harrington | |
| 2011/0072773 A1 | 3/2011 | Schroeder et al. | |
| 2011/0084851 A1 | 4/2011 | Peterson et al. | |
| 2011/0086684 A1 | 4/2011 | Luellen et al. | |
| 2011/0160961 A1 | 6/2011 | Wollenhaupt et al. | |
| 2011/0213531 A1 | 9/2011 | Farley et al. | |
| 2011/0224873 A1 | 9/2011 | Reeve et al. | |
| 2011/0227745 A1 | 9/2011 | Kikuchi et al. | |
| 2011/0257850 A1 | 10/2011 | Reeve et al. | |
| 2011/0270494 A1 | 11/2011 | Imhof et al. | |
| 2011/0270495 A1* | 11/2011 | Knapp | A01D 41/1243 701/50 |
| 2011/0295460 A1 | 12/2011 | Hunt et al. | |
| 2011/0307149 A1 | 12/2011 | Pighi | |
| 2012/0004813 A1* | 1/2012 | Baumgarten | A01D 41/127 701/50 |
| 2012/0029732 A1 | 2/2012 | Meyer | |
| 2012/0087771 A1* | 4/2012 | Wenzel | A01F 12/50 414/808 |
| 2012/0096827 A1* | 4/2012 | Chaney | A01F 15/106 56/341 |
| 2012/0143642 A1 | 6/2012 | O'Neil | |
| 2012/0215378 A1 | 8/2012 | Sprock | |
| 2012/0215379 A1 | 8/2012 | Sprock | |
| 2012/0253611 A1 | 10/2012 | Zielke et al. | |
| 2012/0263560 A1 | 10/2012 | Diekhans | |
| 2012/0265412 A1 | 10/2012 | Diekhans | |
| 2012/0271489 A1 | 10/2012 | Roberts et al. | |
| 2012/0323452 A1 | 12/2012 | Green et al. | |
| 2013/0019580 A1 | 1/2013 | Anderson | |
| 2013/0022430 A1 | 1/2013 | Anderson | |
| 2013/0046419 A1 | 2/2013 | Anderson | |
| 2013/0046439 A1 | 2/2013 | Anderson | |
| 2013/0046525 A1* | 2/2013 | Ali | G05D 1/0221 703/6 |
| 2013/0124239 A1 | 5/2013 | Rosa | |
| 2013/0184944 A1 | 7/2013 | Missotten | |
| 2013/0197767 A1 | 8/2013 | Lenz | |
| 2013/0205733 A1 | 8/2013 | Peters | |
| 2013/0210505 A1 | 8/2013 | Bischoff | |

(56) References Cited

U.S. PATENT DOCUMENTS

| | | |
|---|---|---|
| 2013/0231823 A1 | 9/2013 | Wang et al. |
| 2013/0319941 A1 | 12/2013 | Schneider |
| 2013/0325242 A1 | 12/2013 | Cavender-Bares et al. |
| 2013/0332003 A1 | 12/2013 | Murray et al. |
| 2014/0002489 A1 | 1/2014 | Sauder et al. |
| 2014/0019017 A1 | 1/2014 | Wilken et al. |
| 2014/0021598 A1 | 1/2014 | Sutardja |
| 2014/0050364 A1 | 2/2014 | Brueckner |
| 2014/0067745 A1 | 3/2014 | Avey et al. |
| 2014/0121882 A1* | 5/2014 | Gilmore ............... G05D 1/0295 701/25 |
| 2014/0129048 A1 | 5/2014 | Baumgarten et al. |
| 2014/0172222 A1 | 6/2014 | Nickel |
| 2014/0172224 A1 | 6/2014 | Matthews et al. |
| 2014/0172225 A1 | 6/2014 | Matthews et al. |
| 2014/0208870 A1 | 7/2014 | Quaderer et al. |
| 2014/0215984 A1 | 8/2014 | Bischoff |
| 2014/0230391 A1 | 8/2014 | Hendrickson et al. |
| 2014/0230392 A1 | 8/2014 | Dybro et al. |
| 2014/0236381 A1 | 8/2014 | Anderson et al. |
| 2014/0236431 A1 | 8/2014 | Hendrickson et al. |
| 2014/0257911 A1 | 9/2014 | Anderson |
| 2014/0262547 A1 | 9/2014 | Acheson |
| 2014/0277960 A1* | 9/2014 | Blank ............... G05B 13/0275 701/50 |
| 2014/0297242 A1 | 10/2014 | Sauder et al. |
| 2014/0303814 A1 | 10/2014 | Burema et al. |
| 2014/0324272 A1 | 10/2014 | Madsen et al. |
| 2014/0331631 A1 | 11/2014 | Sauder et al. |
| 2014/0338298 A1 | 11/2014 | Jung et al. |
| 2014/0350802 A1 | 11/2014 | Biggerstaff et al. |
| 2014/0360148 A1 | 12/2014 | Wienker et al. |
| 2015/0049088 A1 | 2/2015 | Snyder et al. |
| 2015/0088785 A1 | 3/2015 | Chi |
| 2015/0095830 A1 | 4/2015 | Massoumi et al. |
| 2015/0101519 A1 | 4/2015 | Blackwell et al. |
| 2015/0105984 A1 | 4/2015 | Birrell et al. |
| 2015/0124054 A1 | 5/2015 | Darr et al. |
| 2015/0168187 A1 | 6/2015 | Myers |
| 2015/0211199 A1 | 7/2015 | Corcoran et al. |
| 2015/0230403 A1 | 8/2015 | Jung et al. |
| 2015/0242799 A1 | 8/2015 | Seki et al. |
| 2015/0243114 A1 | 8/2015 | Tanabe et al. |
| 2015/0254800 A1 | 9/2015 | Johnson et al. |
| 2015/0264863 A1 | 9/2015 | Muench et al. |
| 2015/0276794 A1 | 10/2015 | Pistrol et al. |
| 2015/0278640 A1 | 10/2015 | Johnson et al. |
| 2015/0285647 A1 | 10/2015 | Meyer zu Helligen et al. |
| 2015/0293029 A1 | 10/2015 | Acheson |
| 2015/0302305 A1 | 10/2015 | Rupp et al. |
| 2015/0305238 A1 | 10/2015 | Klausmann et al. |
| 2015/0305239 A1 | 10/2015 | Jung |
| 2015/0327440 A1 | 11/2015 | Dybro et al. |
| 2015/0351320 A1 | 12/2015 | Takahara et al. |
| 2015/0370935 A1 | 12/2015 | Starr |
| 2015/0373902 A1 | 12/2015 | Pasquier |
| 2015/0379785 A1 | 12/2015 | Brown, Jr. |
| 2016/0025531 A1 | 1/2016 | Bischoff et al. |
| 2016/0029558 A1 | 2/2016 | Dybro et al. |
| 2016/0052525 A1 | 2/2016 | Tuncer et al. |
| 2016/0057922 A1 | 3/2016 | Freiberg et al. |
| 2016/0066505 A1 | 3/2016 | Bakke et al. |
| 2016/0073573 A1 | 3/2016 | Ethington et al. |
| 2016/0078375 A1 | 3/2016 | Ethington et al. |
| 2016/0078570 A1 | 3/2016 | Ethington et al. |
| 2016/0088794 A1 | 3/2016 | Baumgarten et al. |
| 2016/0106038 A1 | 4/2016 | Boyd et al. |
| 2016/0084813 A1 | 5/2016 | Anderson et al. |
| 2016/0146611 A1 | 5/2016 | Matthews |
| 2016/0202227 A1 | 7/2016 | Mathur et al. |
| 2016/0203657 A1 | 7/2016 | Bell et al. |
| 2016/0212939 A1 | 7/2016 | Ouchida et al. |
| 2016/0215994 A1 | 7/2016 | Mewes et al. |
| 2016/0232621 A1 | 8/2016 | Ethington et al. |
| 2016/0247075 A1 | 8/2016 | Mewes et al. |
| 2016/0247082 A1 | 8/2016 | Stehling et al. |
| 2016/0260021 A1 | 9/2016 | Marek |
| 2016/0286720 A1 | 10/2016 | Heitmann et al. |
| 2016/0286721 A1 | 10/2016 | Heitmann et al. |
| 2016/0286722 A1 | 10/2016 | Heitmann et al. |
| 2016/0309656 A1 | 10/2016 | Wilken et al. |
| 2016/0327535 A1* | 11/2016 | Cotton ............... G01N 33/0098 |
| 2016/0330906 A1* | 11/2016 | Acheson ............... A01D 41/127 |
| 2016/0338267 A1 | 11/2016 | Anderson et al. |
| 2016/0342915 A1 | 11/2016 | Humphrey |
| 2016/0345485 A1 | 12/2016 | Acheson et al. |
| 2016/0360697 A1 | 12/2016 | Diaz |
| 2017/0013773 A1 | 1/2017 | Kirk et al. |
| 2017/0031365 A1 | 2/2017 | Sugumaran et al. |
| 2017/0034997 A1 | 2/2017 | Mayerle |
| 2017/0049045 A1 | 2/2017 | Wilken et al. |
| 2017/0055433 A1 | 3/2017 | Jamison |
| 2017/0082442 A1 | 3/2017 | Anderson |
| 2017/0083024 A1 | 3/2017 | Reijersen Van Buuren |
| 2017/0086381 A1* | 3/2017 | Roell ............... A01D 91/04 |
| 2017/0089741 A1 | 3/2017 | Takahashi et al. |
| 2017/0089742 A1 | 3/2017 | Bruns et al. |
| 2017/0090068 A1 | 3/2017 | Xiang et al. |
| 2017/0105331 A1 | 4/2017 | Herlitzius et al. |
| 2017/0105335 A1 | 4/2017 | Xu et al. |
| 2017/0112049 A1 | 4/2017 | Weisberg et al. |
| 2017/0112061 A1 | 4/2017 | Meyer |
| 2017/0115862 A1 | 4/2017 | Stratton et al. |
| 2017/0118915 A1 | 5/2017 | Middelberg et al. |
| 2017/0124463 A1 | 5/2017 | Chen et al. |
| 2017/0127606 A1 | 5/2017 | Horton |
| 2017/0160916 A1 | 6/2017 | Baumgarten et al. |
| 2017/0161627 A1 | 6/2017 | Xu et al. |
| 2017/0185086 A1 | 6/2017 | Sauder et al. |
| 2017/0188515 A1 | 7/2017 | Baumgarten et al. |
| 2017/0192431 A1 | 7/2017 | Foster et al. |
| 2017/0208742 A1* | 7/2017 | Ingibergsson ....... A01D 41/127 |
| 2017/0213141 A1 | 7/2017 | Xu et al. |
| 2017/0215330 A1 | 8/2017 | Missotten et al. |
| 2017/0223947 A1 | 8/2017 | Gall et al. |
| 2017/0227969 A1 | 8/2017 | Murray et al. |
| 2017/0235471 A1 | 8/2017 | Scholer et al. |
| 2017/0245434 A1 | 8/2017 | Jung et al. |
| 2017/0251600 A1 | 9/2017 | Anderson et al. |
| 2017/0270446 A1 | 9/2017 | Starr et al. |
| 2017/0270616 A1 | 9/2017 | Basso |
| 2017/0316692 A1 | 11/2017 | Rusciolelli et al. |
| 2017/0318743 A1* | 11/2017 | Sauder ............... A01B 79/005 |
| 2017/0322550 A1 | 11/2017 | Yokoyama |
| 2017/0332551 A1 | 11/2017 | Todd et al. |
| 2017/0336787 A1 | 11/2017 | Pichlmaier et al. |
| 2017/0370765 A1 | 12/2017 | Meier et al. |
| 2018/0000011 A1 | 1/2018 | Schleusner et al. |
| 2018/0014452 A1 | 1/2018 | Starr |
| 2018/0022559 A1 | 1/2018 | Knutson |
| 2018/0024549 A1 | 1/2018 | Hurd |
| 2018/0035622 A1 | 2/2018 | Gresch et al. |
| 2018/0054955 A1 | 3/2018 | Oliver |
| 2018/0060975 A1 | 3/2018 | Hassanzadeh |
| 2018/0070534 A1 | 3/2018 | Mayerle |
| 2018/0077865 A1 | 3/2018 | Gallmeier |
| 2018/0084709 A1 | 3/2018 | Wieckhorst et al. |
| 2018/0084722 A1 | 3/2018 | Wieckhorst et al. |
| 2018/0092301 A1 | 4/2018 | Vandike et al. |
| 2018/0092302 A1 | 4/2018 | Vandike et al. |
| 2018/0108123 A1 | 4/2018 | Baurer et al. |
| 2018/0120133 A1 | 5/2018 | Blank et al. |
| 2018/0121821 A1 | 5/2018 | Parsons et al. |
| 2018/0124992 A1 | 5/2018 | Koch et al. |
| 2018/0129879 A1 | 5/2018 | Achtelik et al. |
| 2018/0132422 A1 | 5/2018 | Hassanzadeh et al. |
| 2018/0136664 A1 | 5/2018 | Tomita et al. |
| 2018/0146612 A1 | 5/2018 | Sauder et al. |
| 2018/0146624 A1 | 5/2018 | Chen et al. |
| 2018/0153084 A1 | 6/2018 | Calleija et al. |
| 2018/0177125 A1 | 6/2018 | Takahara et al. |
| 2018/0181893 A1 | 6/2018 | Basso |
| 2018/0196438 A1 | 7/2018 | Newlin et al. |
| 2018/0196441 A1 | 7/2018 | Muench et al. |

(56) References Cited

U.S. PATENT DOCUMENTS

| | | |
|---|---|---|
| 2018/0211156 A1 | 7/2018 | Guan et al. |
| 2018/0232674 A1 | 8/2018 | Bilde |
| 2018/0242523 A1 | 8/2018 | Kirchbeck et al. |
| 2018/0249641 A1 | 9/2018 | Lewis et al. |
| 2018/0257657 A1 | 9/2018 | Blank et al. |
| 2018/0271015 A1 | 9/2018 | Redden et al. |
| 2018/0279599 A1 | 10/2018 | Struve |
| 2018/0295771 A1 | 10/2018 | Peters |
| 2018/0310474 A1 | 11/2018 | Posselius et al. |
| 2018/0317381 A1 | 11/2018 | Bassett |
| 2018/0317385 A1 | 11/2018 | Wellensiek et al. |
| 2018/0325012 A1 | 11/2018 | Ferrari et al. |
| 2018/0325014 A1 | 11/2018 | Debbaut |
| 2018/0338422 A1 | 11/2018 | Brubaker |
| 2018/0340845 A1 | 11/2018 | Rhodes et al. |
| 2018/0359917 A1 | 12/2018 | Blank et al. |
| 2018/0359919 A1 | 12/2018 | Blank et al. |
| 2018/0364726 A1 | 12/2018 | Foster et al. |
| 2019/0021226 A1 | 1/2019 | Dima et al. |
| 2019/0025175 A1 | 1/2019 | Laugwitz |
| 2019/0050948 A1 * | 2/2019 | Perry .................. G06Q 10/04 |
| 2019/0057460 A1 | 2/2019 | Sakaguchi et al. |
| 2019/0066234 A1 | 2/2019 | Bedoya et al. |
| 2019/0069470 A1 | 3/2019 | Pfeiffer et al. |
| 2019/0075727 A1 | 3/2019 | Duke et al. |
| 2019/0085785 A1 | 3/2019 | Abolt |
| 2019/0090423 A1 | 3/2019 | Escher et al. |
| 2019/0098825 A1 | 4/2019 | Neitemeier et al. |
| 2019/0104722 A1 | 4/2019 | Slaughter et al. |
| 2019/0108413 A1 | 4/2019 | Chen et al. |
| 2019/0114847 A1 | 4/2019 | Wagner et al. |
| 2019/0124819 A1 | 5/2019 | Madsen et al. |
| 2019/0129430 A1 | 5/2019 | Madsen et al. |
| 2019/0136491 A1 | 5/2019 | Martin et al. |
| 2019/0138962 A1 | 5/2019 | Ehlmann et al. |
| 2019/0147094 A1 | 5/2019 | Zhan et al. |
| 2019/0147249 A1 | 5/2019 | Kiepe et al. |
| 2019/0156255 A1 | 5/2019 | Carroll |
| 2019/0174667 A1 | 6/2019 | Gresch et al. |
| 2019/0183047 A1 | 6/2019 | Dybro et al. |
| 2019/0200522 A1 * | 7/2019 | Hansen ................ A01D 41/127 |
| 2019/0230855 A1 | 8/2019 | Reed et al. |
| 2019/0239416 A1 | 8/2019 | Green et al. |
| 2019/0261550 A1 | 8/2019 | Damme et al. |
| 2019/0261559 A1 | 8/2019 | Heitmann et al. |
| 2019/0261560 A1 | 8/2019 | Jelenkovic |
| 2019/0313570 A1 | 10/2019 | Owechko |
| 2019/0327889 A1 | 10/2019 | Borgstadt |
| 2019/0327892 A1 | 10/2019 | Fries et al. |
| 2019/0335662 A1 | 11/2019 | Good et al. |
| 2019/0335674 A1 | 11/2019 | Basso |
| 2019/0343035 A1 | 11/2019 | Smith et al. |
| 2019/0343043 A1 | 11/2019 | Bormann et al. |
| 2019/0343044 A1 | 11/2019 | Bormann et al. |
| 2019/0343048 A1 | 11/2019 | Farley et al. |
| 2019/0351765 A1 | 11/2019 | Rabusic |
| 2019/0354081 A1 | 11/2019 | Blank et al. |
| 2019/0364733 A1 | 12/2019 | Laugen et al. |
| 2019/0364734 A1 | 12/2019 | Kriebel et al. |
| 2019/3647341 | 12/2019 | Kriebel et al. |
| 2020/0000006 A1 | 1/2020 | McDonald et al. |
| 2020/0008351 A1 | 1/2020 | Zielke et al. |
| 2020/0015416 A1 | 1/2020 | Barther et al. |
| 2020/0019159 A1 | 1/2020 | Kocer et al. |
| 2020/0024102 A1 | 1/2020 | Brill et al. |
| 2020/0029488 A1 | 1/2020 | Bertucci et al. |
| 2020/0034759 A1 | 1/2020 | Dumstorff et al. |
| 2020/0037491 A1 | 2/2020 | Schoeny et al. |
| 2020/0053961 A1 | 2/2020 | Dix et al. |
| 2020/0064144 A1 | 2/2020 | Tomita et al. |
| 2020/0064863 A1 | 2/2020 | Tomita et al. |
| 2020/0074023 A1 | 3/2020 | Nizami et al. |
| 2020/0084963 A1 | 3/2020 | Gururajan et al. |
| 2020/0084966 A1 | 3/2020 | Corban et al. |
| 2020/0090094 A1 | 3/2020 | Blank |
| 2020/0097851 A1 | 3/2020 | Alvarez et al. |
| 2020/0113142 A1 | 4/2020 | Coleman et al. |
| 2020/0125822 A1 | 4/2020 | Yang et al. |
| 2020/0128732 A1 | 4/2020 | Chaney |
| 2020/0128733 A1 | 4/2020 | Vandike et al. |
| 2020/0128734 A1 | 4/2020 | Brammeier et al. |
| 2020/0128735 A1 | 4/2020 | Bonefas et al. |
| 2020/0128737 A1 | 4/2020 | Anderson et al. |
| 2020/0128738 A1 | 4/2020 | Suleman et al. |
| 2020/0128740 A1 | 4/2020 | Suleman |
| 2020/0133262 A1 | 4/2020 | Suleman et al. |
| 2020/0141784 A1 | 5/2020 | Lange et al. |
| 2020/0146203 A1 | 5/2020 | Deng |
| 2020/0150631 A1 | 5/2020 | Frieberg et al. |
| 2020/0154639 A1 | 5/2020 | Takahara et al. |
| 2020/0163277 A1 | 5/2020 | Cooksey et al. |
| 2020/0183406 A1 | 6/2020 | Borgstadt |
| 2020/0187409 A1 | 6/2020 | Meyer Zu Helligen |
| 2020/0196526 A1 | 6/2020 | Koch et al. |
| 2020/0202596 A1 | 6/2020 | Kitahara et al. |
| 2020/0221632 A1 | 7/2020 | Strnad et al. |
| 2020/0221635 A1 | 7/2020 | Hendrickson et al. |
| 2020/0221636 A1 | 7/2020 | Boydens et al. |
| 2020/0265527 A1 | 8/2020 | Rose et al. |
| 2020/0317114 A1 | 10/2020 | Hoff |
| 2020/0319632 A1 | 10/2020 | Desai et al. |
| 2020/0319655 A1 | 10/2020 | Desai et al. |
| 2020/0323133 A1 | 10/2020 | Anderson et al. |
| 2020/0323134 A1 | 10/2020 | Darr et al. |
| 2020/0326674 A1 | 10/2020 | Palla et al. |
| 2020/0326727 A1 | 10/2020 | Palla et al. |
| 2020/0333278 A1 | 10/2020 | Locken et al. |
| 2020/0337232 A1 | 10/2020 | Blank et al. |
| 2020/0352099 A1 | 11/2020 | Meier et al. |
| 2020/0359547 A1 | 11/2020 | Sakaguchi et al. |
| 2020/0359549 A1 | 11/2020 | Sakaguchi et al. |
| 2020/0363256 A1 | 11/2020 | Meier et al. |
| 2020/0375083 A1 | 12/2020 | Anderson et al. |
| 2020/0375084 A1 | 12/2020 | Sakaguchi et al. |
| 2020/0378088 A1 | 12/2020 | Anderson |
| 2020/0404842 A1 | 12/2020 | Dugas et al. |
| 2021/0015041 A1 | 1/2021 | Bormann et al. |
| 2021/0176916 A1 | 6/2021 | Sidon et al. |
| 2021/0176918 A1 | 6/2021 | Franzen et al. |

FOREIGN PATENT DOCUMENTS

| | | | |
|---|---|---|---|
| BR | PI0502658 A | 2/2007 | |
| BR | PI0802384 A2 | 3/2010 | |
| BR | PI1100258 A2 | 3/2014 | |
| BR | 102014007178 A2 | 8/2016 | |
| CA | 1165300 A * | 4/1984 | ............ G01F 11/24 |
| CA | 1165300 A | 4/1984 | |
| CA | 2283767 A1 | 3/2001 | |
| CA | 2330979 A1 | 8/2001 | |
| CA | 2629555 A1 | 11/2009 | |
| CA | 135611 S | 5/2011 | |
| CN | 2451633 Y | 10/2001 | |
| CN | 101236188 A | 8/2008 | |
| CN | 100416590 C | 9/2008 | |
| CN | 101303338 A | 11/2008 | |
| CN | 101363833 A | 2/2009 | |
| CN | 201218789 Y | 4/2009 | |
| CN | 101839906 A | 9/2010 | |
| CN | 101929166 A | 12/2010 | |
| CN | 102080373 A | 6/2011 | |
| CN | 102138383 A | 8/2011 | |
| CN | 102277867 B | 12/2011 | |
| CN | 202110103 U | 1/2012 | |
| CN | 202119772 U | 1/2012 | |
| CN | 202340435 U | 7/2012 | |
| CN | 103088807 A | 5/2013 | |
| CN | 103181263 A | 7/2013 | |
| CN | 203053961 U | 7/2013 | |
| CN | 203055121 U | 7/2013 | |
| CN | 203206739 U | 9/2013 | |
| CN | 102277867 B | 10/2013 | |
| CN | 203275401 U | 11/2013 | |
| CN | 203613525 U | 5/2014 | |

(56) References Cited

FOREIGN PATENT DOCUMENTS

| | | |
|---|---|---|
| CN | 203658201 U | 6/2014 |
| CN | 103954738 A | 7/2014 |
| CN | 203741803 U | 7/2014 |
| CN | 204000818 U | 12/2014 |
| CN | 204435344 U | 7/2015 |
| CN | 204475304 U | 7/2015 |
| CN | 105205248 A | 12/2015 |
| CN | 204989174 U | 1/2016 |
| CN | 105432228 A | 3/2016 |
| CN | 105741180 A | 7/2016 |
| CN | 106053330 A | 10/2016 |
| CN | 106198877 A | 12/2016 |
| CN | 106198879 A | 12/2016 |
| CN | 106226470 A | 12/2016 |
| CN | 106248873 A | 12/2016 |
| CN | 106290800 A | 1/2017 |
| CN | 106327349 A | 1/2017 |
| CN | 106644663 A | 5/2017 |
| CN | 206330815 U | 7/2017 |
| CN | 206515118 U | 9/2017 |
| CN | 206515119 U | 9/2017 |
| CN | 206616118 U | 11/2017 |
| CN | 206696107 | 12/2017 |
| CN | 206696107 U | 12/2017 |
| CN | 107576674 | 1/2018 |
| CN | 107576674 A | 1/2018 |
| CN | 206906093 U | 1/2018 |
| CN | 206941558 | 1/2018 |
| CN | 206941558 U | 1/2018 |
| CN | 107736088 A | 2/2018 |
| CN | 107795095 A | 3/2018 |
| CN | 207079558 | 3/2018 |
| CN | 107941286 A | 4/2018 |
| CN | 107957408 A | 4/2018 |
| CN | 108009542 A | 5/2018 |
| CN | 108304796 A | 7/2018 |
| CN | 207567744 U | 7/2018 |
| CN | 108614089 A | 10/2018 |
| CN | 208013131 U | 10/2018 |
| CN | 108881825 A | 11/2018 |
| CN | 208047351 U | 11/2018 |
| CN | 109357804 A | 2/2019 |
| CN | 109485353 A | 3/2019 |
| CN | 109633127 A | 4/2019 |
| CN | 109763476 A | 5/2019 |
| CN | 109961024 A | 7/2019 |
| CN | 110262287 A | 9/2019 |
| CN | 110720302 A | 1/2020 |
| CN | 111201879 A | 5/2020 |
| CN | 210585958 U | 5/2020 |
| CN | 111406505 A | 7/2020 |
| CS | 247426 B1 | 12/1986 |
| CS | 248318 B1 | 2/1987 |
| CZ | 17266 U1 | 2/2007 |
| CZ | 20252 U1 | 11/2009 |
| DE | 2354828 A1 | 5/1975 |
| DE | 152380 A1 | 11/1981 |
| DE | 3728669 A1 | 3/1989 |
| DE | 4431824 C1 | 5/1996 |
| DE | 19509496 A1 | 9/1996 |
| DE | 19528663 A1 | 2/1997 |
| DE | 19718455 A1 | 11/1997 |
| DE | 19705842 A1 | 8/1998 |
| DE | 19828355 A1 | 1/2000 |
| DE | 10050224 A1 | 4/2002 |
| DE | 10120173 A1 | 10/2002 |
| DE | 202004015141 U1 | 12/2004 |
| DE | 102005000770 83 | 7/2006 |
| DE | 102005000770 B3 | 7/2006 |
| DE | 102005000771 A1 | 8/2006 |
| DE | 102008021785 A1 | 11/2009 |
| DE | 102009041646 A1 | 3/2011 |
| DE | 102010004648 A1 | 7/2011 |
| DE | 102010038661 A1 | 2/2012 |
| DE | 102011005400 A1 | 9/2012 |
| DE | 202012103730 U1 | 10/2012 |
| DE | 102011052688 A1 | 2/2013 |
| DE | 102012211001 A1 | 1/2014 |
| DE | 102012220109 | 5/2014 |
| DE | 102012223768 | 6/2014 |
| DE | 102013212151 A1 | 12/2014 |
| DE | 102013019098 B3 | 1/2015 |
| DE | 102014108449 A1 | 2/2015 |
| DE | 2014201203 A1 | 7/2015 |
| DE | 102010038661 A1 | 10/2015 |
| DE | 102014208068 A1 | 10/2015 |
| DE | 102015006398 B3 | 5/2016 |
| DE | 102015109799 A1 | 12/2016 |
| DE | 112015002194 T5 | 1/2017 |
| DE | 102017204511 A1 | 9/2018 |
| DE | 102019114872 A1 | 12/2020 |
| EP | 0070219 B1 | 10/1984 |
| EP | 0355049 A2 | 2/1990 |
| EP | 0845198 A1 | 6/1998 |
| EP | 845198 B2 | 6/1998 |
| EP | 0532146 B1 | 8/1998 |
| EP | 1444879 A1 | 8/2004 |
| EP | 1219159 B1 | 6/2005 |
| EP | 1219153 B1 | 2/2006 |
| EP | 1692928 A2 | 8/2006 |
| EP | 1574122 B1 | 2/2008 |
| EP | 1943877 A2 | 7/2008 |
| EP | 1598586 B1 | 9/2009 |
| EP | 1731983 B1 | 9/2009 |
| EP | 2146307 A2 | 1/2010 |
| EP | 0845198 B2 | 2/2010 |
| EP | 2186389 A1 | 5/2010 |
| EP | 2267566 A2 | 12/2010 |
| EP | 3491192 A2 | 12/2010 |
| EP | 2057884 B1 | 1/2011 |
| EP | 2146307 B1 | 5/2012 |
| EP | 2446732 A1 | 5/2012 |
| EP | 2446732 A1 * | 5/2012 | ......... A01F 15/0816 |
| EP | 2524586 A2 | 11/2012 |
| EP | 2529610 A1 | 12/2012 |
| EP | 2243353 B1 | 3/2013 |
| EP | 2174537 B1 | 5/2013 |
| EP | 2592919 A1 | 5/2013 |
| EP | 1674324 B2 | 5/2014 |
| EP | 2759829 A1 | 7/2014 |
| EP | 2764764 B1 | 8/2014 |
| EP | 2267566 A3 | 12/2014 |
| EP | 2191439 B1 | 3/2015 |
| EP | 2586286 B1 | 3/2015 |
| EP | 2592919 B1 | 9/2015 |
| EP | 2921042 A1 | 9/2015 |
| EP | 2944725 A1 | 11/2015 |
| EP | 2764764 B1 | 12/2015 |
| EP | 2510777 B1 | 3/2016 |
| EP | 2997805 A1 | 3/2016 |
| EP | 3000302 A1 | 3/2016 |
| EP | 2868806 B1 | 7/2016 |
| EP | 3085221 A1 | 10/2016 |
| EP | 3095310 A1 | 11/2016 |
| EP | 3097759 A1 | 11/2016 |
| EP | 2452551 B1 | 5/2017 |
| EP | 3175691 A1 | 6/2017 |
| EP | 3195719 A1 | 7/2017 |
| EP | 3195720 A1 | 7/2017 |
| EP | 3259976 A1 | 12/2017 |
| EP | 3262934 A1 | 1/2018 |
| EP | 3491192 A1 | 1/2018 |
| EP | 3287007 A1 | 2/2018 |
| EP | 3298876 A1 | 3/2018 |
| EP | 3300579 A1 | 4/2018 |
| EP | 3315005 A1 | 5/2018 |
| EP | 3316208 A1 | 5/2018 |
| EP | 2829171 B1 | 6/2018 |
| EP | 2508057 | 7/2018 |
| EP | 2508057 B1 | 7/2018 |
| EP | 3378298 A1 | 9/2018 |
| EP | 3378299 A1 | 9/2018 |
| EP | 2997805 81 | 10/2018 |
| EP | 2997805 A1 | 10/2018 |

(56) References Cited

FOREIGN PATENT DOCUMENTS

| | | | |
|---|---|---|---|
| EP | 3384754 A1 | 10/2018 |
| EP | 3289853 B1 | 3/2019 |
| EP | 3456167 A1 | 3/2019 |
| EP | 3466239 A1 | 4/2019 |
| EP | 3469878 A1 | 4/2019 |
| EP | 3289852 B1 | 6/2019 |
| EP | 3491192 A1 | 6/2019 |
| EP | 3494770 A1 | 6/2019 |
| EP | 3498074 A1 | 6/2019 |
| EP | 3000302 B1 | 8/2019 |
| EP | 3533314 A1 | 9/2019 |
| EP | 3569049 A1 | 11/2019 |
| EP | 3000307 B1 | 12/2019 |
| EP | 3586592 A2 | 1/2020 |
| EP | 3593613 A1 | 1/2020 |
| EP | 3593620 A1 | 1/2020 |
| EP | 3613272 A1 | 2/2020 |
| EP | 3243374 B1 | 3/2020 |
| EP | 3626038 A1 | 3/2020 |
| EP | 3259976 B1 | 4/2020 |
| EP | 3635647 A1 | 4/2020 |
| EP | 3378298 B1 | 5/2020 |
| EP | 3646699 A1 | 5/2020 |
| EP | 3662741 A1 | 6/2020 |
| EP | 3685648 A1 | 7/2020 |
| EP | 2995191 B2 | 10/2020 |
| ES | 2116215 A1 | 7/1998 |
| ES | 2311322 A1 | 2/2009 |
| FI | 5533 A | 11/1913 |
| FR | 1451480 A | 1/1966 |
| FR | 2817344 A1 | 5/2002 |
| FR | 2901291 A | 11/2007 |
| FR | 2901291 A1 | 11/2007 |
| GB | 901081 A | 7/1962 |
| GB | 201519517 A1 | 5/2017 |
| GN | 203206739 U | 9/2013 |
| IN | 1632DE2014 | 8/2016 |
| IN | 01632DE2014 A | 8/2016 |
| IN | 1632DE2014 A | 8/2016 |
| IN | 201641027017 A | 10/2016 |
| IN | 202041039250 A | 9/2020 |
| JP | S60253617 A | 12/1985 |
| JP | S63308110 A | 12/1988 |
| JP | H02196960 A | 8/1990 |
| JP | H02215311 A | 8/1990 |
| JP | H0779681 A | 3/1995 |
| JP | H1066436 A | 3/1998 |
| JP | H10191762 A | 7/1998 |
| JP | 2000352044 A | 12/2000 |
| JP | 2001057809 A | 3/2001 |
| JP | 2002186348 A | 7/2002 |
| JP | 2005227233 A | 8/2005 |
| JP | 2006166871 A | 6/2006 |
| JP | 2011205967 A | 10/2011 |
| JP | 2015070812 A | 4/2015 |
| JP | 2015151826 A | 8/2015 |
| JP | 2015219651 A | 12/2015 |
| JP | 2016071726 A | 5/2016 |
| JP | 2016160808 A | 9/2016 |
| JP | 6087258 B2 | 3/2017 |
| JP | 2017136035 A | 8/2017 |
| JP | 2017137729 A | 8/2017 |
| JP | 2017195804 A | 11/2017 |
| JP | 2018068284 A | 5/2018 |
| JP | 2018102154 A | 7/2018 |
| JP | 2018151388 A | 9/2018 |
| JP | 2019004796 A | 1/2019 |
| JP | 2019129744 A | 8/2019 |
| JP | 2019146506 A | 9/2019 |
| JP | 2019216744 A | 12/2019 |
| JP | 2020018255 A | 2/2020 |
| JP | 2020031607 A | 3/2020 |
| JP | 2020113062 A | 7/2020 |
| JP | 2020127405 A | 8/2020 |
| KR | 100974892 | 8/2010 |
| KR | 100974892 B1 | 8/2010 |
| KR | 20110018582 A | 2/2011 |
| KR | 101067576 B | 9/2011 |
| KR | 101067576 B1 | 9/2011 |
| KR | 101134075 B1 | 4/2012 |
| KR | 101447197 B1 | 10/2014 |
| KR | 101653750 | 9/2016 |
| KR | 20170041377 A | 4/2017 |
| KR | 200485051 Y | 11/2017 |
| KR | 200485051 Y1 | 11/2017 |
| KR | 101873657 B | 8/2018 |
| MX | 06000012 A | 1/2008 |
| PL | 178299 B1 | 4/2000 |
| RO | 130713 | 11/2015 |
| RU | 1791767 C | 1/1993 |
| RU | 2005102554 A | 7/2006 |
| RU | 2421744 C | 6/2011 |
| RU | 2421744 C1 | 6/2011 |
| RU | 2502047 C | 12/2013 |
| RU | 2502047 C1 | 12/2013 |
| RU | 164128 | 8/2016 |
| RU | 2017114139 A3 | 5/2019 |
| SU | 834514 A1 | 5/1981 |
| SU | 887717 A1 | 12/1981 |
| SU | 1052940 A1 | 11/1983 |
| SU | 1134669 A1 | 1/1985 |
| SU | 1526588 A1 | 12/1989 |
| SU | 1761864 A1 | 9/1992 |
| WO | 1986005353 A1 | 9/1986 |
| WO | 2001052160 A1 | 7/2001 |
| WO | 2002015673 A1 | 2/2002 |
| WO | 2003005803 A1 | 1/2003 |
| WO | 2007050192 A2 | 5/2007 |
| WO | 2009156542 A1 | 12/2009 |
| WO | 2010003421 A1 | 1/2010 |
| WO | 2011104085 A1 | 9/2011 |
| WO | 2012041621 A1 | 4/2012 |
| WO | 2012110508 A1 | 8/2012 |
| WO | 2012110544 A1 | 8/2012 |
| WO | 2013063106 A2 | 5/2013 |
| WO | 2013079247 A1 | 6/2013 |
| WO | 2013086351 A1 | 6/2013 |
| WO | 2013087275 A1 | 6/2013 |
| WO | 2014046685 A1 | 3/2014 |
| WO | 2014093814 A1 | 6/2014 |
| WO | 2014195302 A1 | 12/2014 |
| WO | WO-2014195302 A1 * | 12/2014 | ............ G05B 15/02 |
| WO | 2015038751 A1 | 3/2015 |
| WO | 2015153809 A1 | 10/2015 |
| WO | 16020595 A1 | 2/2016 |
| WO | 2016020595 A1 | 2/2016 |
| WO | 2016118686 A1 | 7/2016 |
| WO | 2017008161 A1 | 1/2017 |
| WO | 2017060168 A1 | 4/2017 |
| WO | 2017077113 A1 | 5/2017 |
| WO | 2017096489 A1 | 6/2017 |
| WO | 2017099570 A1 | 6/2017 |
| WO | 2017116913 A1 | 7/2017 |
| WO | WO-2017116913 A1 * | 7/2017 | ........... F16D 48/066 |
| WO | 2017170507 A1 | 10/2017 |
| WO | 2017205406 A1 | 11/2017 |
| WO | 2017205410 A1 | 11/2017 |
| WO | 2018043336 A1 | 3/2018 |
| WO | 2018073060 A1 | 4/2018 |
| WO | 2018081759 A1 | 5/2018 |
| WO | 2018116772 A1 | 6/2018 |
| WO | 2018142768 A1 | 8/2018 |
| WO | 2018200870 A1 | 11/2018 |
| WO | 2018206587 A1 | 11/2018 |
| WO | 2018220159 A1 | 12/2018 |
| WO | 2018226139 A1 | 12/2018 |
| WO | 2018235486 A1 | 12/2018 |
| WO | 2018235942 A1 | 12/2018 |
| WO | WO18235486 A1 | 12/2018 |
| WO | 2019034213 A1 | 2/2019 |
| WO | 2019079205 A1 | 4/2019 |
| WO | 2019081349 A1 | 5/2019 |
| WO | 2019091535 A1 | 5/2019 |
| WO | 2019109191 A1 | 6/2019 |

(56) References Cited

FOREIGN PATENT DOCUMENTS

| | | | |
|---|---|---|---|
| WO | 2019124225 A1 | 6/2019 | |
| WO | 2019129333 A1 | 7/2019 | |
| WO | 2019129334 A1 | 7/2019 | |
| WO | 2019129335 A1 | 7/2019 | |
| WO | 2019215185 A1 | 11/2019 | |
| WO | 2019230358 A1 | 12/2019 | |
| WO | 2020026578 A1 | 2/2020 | |
| WO | 2020026650 A1 | 2/2020 | |
| WO | 2020026651 A1 | 2/2020 | |
| WO | 2020031473 A1 | 2/2020 | |
| WO | 2020038810 A1 | 2/2020 | |
| WO | 2020039312 A1 | 2/2020 | |
| WO | 2020039671 A1 | 2/2020 | |
| WO | 2020044726 A1 | 3/2020 | |
| WO | 2020082182 A1 | 4/2020 | |
| WO | 2020100810 A1 | 5/2020 | |
| WO | 2020110920 A1 | 6/2020 | |
| WO | 2020195007 A1 | 10/2020 | |
| WO | 2020206941 A1 | 10/2020 | |
| WO | 2020206942 A1 | 10/2020 | |
| WO | 2020210607 A1 | 10/2020 | |
| WO | 2020221981 A1 | 11/2020 | |

OTHER PUBLICATIONS

Yi et al., "An Efficient MAC Protocol With Adaptive Energy Harvesting for Machine-to-Machine Networks," 2015, vol. 3, Publisher: IEEE.*

Zhigen et al., "Research of the Combine Harvester Load Feedback Control System Using Multi-Signal Fusion Method and Fuzzy Algorithm," 2010, Publisher: IEEE.*

Dan et al., "On-the-go Throughput Prediction in a Combine Harvester Using Sensor Fusion," 2017, Publisher: IEEE.*

European Search Report issued in counterpart application No. 19205142.3 dated Mar. 23, 2020 (10 pages).

"Automated Weed Detection With Drones" dated May 25,2917, retrieved at: <<https://www.precisionhawk.com/blog/medla/topic/automated-weed-identification-with-drones>>, retrieved on Jan. 21, 2020, 4 pages.

F. Forcelia, "Estimating the Timing of Weed Emergence". Site-Specific Management Guidelines, retrieved at: <<http://www.ipni.net/publication/ssmg.ns/0/D26EC9A906F9B8C9852579E500773936/SFILE/SSMG-20.pdf>, retrieved on Jan. 21, 2020, 4 pages.

Sa et al.. "WeedMap: A Large-Scale Semantic Weed Mapping Framework Using Aerial Multispectral Imaging and Deep Neural Network for Precision Farming", Sep. 6, 2018, 25 pages.

Fernandez-Quintanilla et at., "Is the current state of the art of weed monitoring sutible for site-specific weed management in arable crops?", First Published May 1, 2018, 4 pages.

K.R. Manjunath et at, "Developing Spectral Library of Major Plant Species of Western Himalayas Using Ground Observations", J Indian Soc Remote Sen (Mar. 2014) 42(a): 201-216,17 pages.

S. Veenadhari et al., "Machine Learning Approach For Forecasting Crop Yield Based on Climatic Parameters", 2014 International Conference on Computer Communication and Informatics (ICCCI-2014) Jan. 3-5, 2014, Coimbatore, INDIA, 5 Pages.

U.S. Appl. No. 17/067,383 Application and Drawings as filed on Oct. 9, 2020, 61 pages.

Leu et al., Grazing Com Residue Using Resources and Reducing Costs, Aug. 2009, 4 pages.

"No-Till Soils", Soil Heath Brochure, 2 pages, last accessed Jul. 14, 2020.

Strickland et al., "Nitrate Toxicity in Livestock" Oklahoma State University, Feb. 2017, 2 pages.

Strickland et al., "Nitrate Toxicity in Livestock" Oklahoma State University, 8 pages, Feb. 2017.

Brownlee, "Neural Networks are Function Approximation Algorithms", Mar. 18, 2020, 13 pages.

Thompson, "Morning glory can make it impossible to harvest com", Feb. 19, 2015, 3 pages.

Tumlison, "Monitoring Growth Development and Yield Estimation of Maize Using Very High-Resolution Uavimages in Gronau, Germany", Feb. 2017, 63 pages.

Hunt, "Mapping Weed Infestations Using Remote Sensing", 8 pages, Jul. 19, 2005.

Wright, et al., "Managing Grain Protein in Wheat Using Remote Sensing", 12 pages, 2003.

"Malting Barley in Pennsylvania", Agronomy Facts 77, 6 pages, Code EE0179 06/16.

"Green stem syndrome in soybeans", Agronomy eUpdate Issue 478 Oct. 10, 2014, 3 pages.

"Keep Weed Seed Out of Your Harvest", Aug. 8, 2019, 1 pages.

Hodrius et al., "The Impact of Multi-Sensor Data Assimilation on Plant Parameter Retrieval and Yield Estimation for Sugar Beet", The International Archives of the Photogrammetry, Remote Sensing and Spatial Information Sciences, vol. XL-7/W3, 2015, 36th International Symposium on Remote Sensing of Environment, May 11-15, 2015, Berlin, Germany, 7 pages.

Fernandez-Quintanilla et al., "Is the current state of the art of weed monitoring suitable for site-specific weed management in arable crops?", Feb. 2018, 35 pages.

Anonymously, "Improved System and Method for Controlling Agricultural Vehicle Operation Using Historical Data", Dec. 16, 2009, 8 pages.

Anonymously, "System and Method for Controlling Agricultural Vehicle Operation Using Historical Data", Jun. 30, 2009, 8 pages.

"Leafsnap, a new mobile appthat identifies plants by leaf shape, is launched by Smithsonian and collaborators", May 2, 2011, 5 pages.

Insect Gallery, Department of Entomology, Kansas State University, Oct. 19, 2020, 8 pages.

Licht, "Influence of Corn Seeding Rate, Soil Attributes, and Topographic Characteristics on Grain Yield, Yield Components, and Grain Composition", 2015, 107 pages.

"Notice of Retraction Virtual simulation of plant with individual stem based on crop growth model", Mar. 5, 2017, 7 pages.

Ma et al., "Identification of Fusarium Head Blight in Winter Wheat Ears Using Continuous Wavelet Analysis", Dec. 19, 2019, 15 pages.

Leland, "Who Did that? Identifying Insect Damage", Apr. 1, 2015, 4 pages.

"How to improve maize protein content" https://www.yara.co.uk/crop-nutrition/forage-maize/improving-maize-protein-content, Sep. 30, 2020, 10 pages.

Hafemeister, "Weed control at harvest, combines are ideal vehicles for spreading weed seeds", Sep. 25, 2019, 3 pages.

"Harvesting Tips", Northern Pulse Growers Association, 9 pages, Jan. 31, 2001.

Wortmann et al., "Harvesting Crop Residues", Aug. 10, 2020, 8 pages.

"Harvesting", Oklahoma State University, Canola Swathing Guide, 2010, 9 pages, last accessed Jul. 14, 2020.

Hanna, "Harvest Tips for Lodged Com", Sep. 6, 2011, 3 pages.

"Green Weeds Complicate Harvest", Crops, Slider, Sep. 26, 2012, 2 pages.

"Agrowatch Green Vegetation Index", Retrieved Dec. 11, 2020, 4 pages.

"Grazing Corn Residues" (http://www.ca.uky.edu), 3 pages, Aug. 24, 2009.

Jarnevich et al., Forecasting Weed Distributions Using Climate Data: A GIS Early Warning Tool, Downloaded on Jul. 13, 2020, 12 pages.

Combine Cutting and Feeding Mechanisms in the Southeast, By J-K Park, Agricultural Research Service, U.S. Dept, of Agriculture, 1963, 1 page.

Hartzler, "Fate of weed seeds in the soil", 4 pages, Jan. 31, 2001.

Digman, "Combine Considerations for a Wet Corn Harvest", Extension SpecialistUW—Madison, 3 pages, Oct. 29, 2009.

S-Series Combine and Front End Equipment Optimization, John Deere Harvester Works, 20 pages Date: Oct. 9, 2017.

Determining yield monitoring system delay time with geostatistical and data segmentation approaches (https://www.ars.usda.gov/ARSUserFiles/50701000/cswq-0036-128359.pdf) Jul. 2002, 13 pages.

(56) References Cited

OTHER PUBLICATIONS

Precision Agriculture: Yield Monitors (dated Nov. 1998—metadata; last accessed Jul. 16, 2020) (https://extensiondata.missouri.edu/pub/pdf/envqual/wq0451.pdf) 4 pages.
Paul et al., "Effect of soil water status and strength on trafficability" (1979) (https://www.nrcresearchpress.com/doi/pdfplus/10.4141/cjss79-035), 12 pages, Apr. 23, 1979.
Sick, "Better understanding corn hybrid characteristics and properties can impact your seed decisions" (https://emergence.fbn.com/agronomy/corn-hybrid-characteristics-and-properties-impact-seed-decisions) By Steve Sick, FBN Breeding Project Lead | Sep. 21, 2018, 8 pages.
Robertson et al., "Maize Stalk Lodging: Morphological Determinants of Stalk Strength" Mar. 2017, 10 pages.
Martin, et al., "Breakage Susceptibility and Hardness of Corn Kernels of Various Sizes and Shapes", May 1987, 10 Pages.
Martin et al., "Breakage Susceptibility and Harness of Corn Kernels of Various Sizes and Shapes", May 1987, 10 pages.
Jones et al., "Brief history of agricultural systems modeling" Jun. 21, 2016, 15 pages.
Dan Anderson, "Brief history of agricultural systems modeling" 1 pages. Aug. 13, 2019.
A.Y. Seflek, "Determining the Physico-Mechanical Characteristics of Maize Stalks Fordesigning Harvester", The Journal of Animal & Plant Sciences, 27(3): 2017, p. 855-860 ISSN: 1018-7081, Jun. 1, 2017.
Carmody, Paul, "Windrowing and harvesting", 8 pages Date: Feb. 3, 2010.
Dabney, et al., "Forage Harvest Representation in RUSLE2", Published Nov. 15, 2013, 17 pages.
John Deere S-Series Combines S760, S770, S780, S790 Brochure, 44 pages, Nov. 15, 2017.
Sekhon et al., "Stalk Bending Strength is Strongly Assoicated with Maize Stalk Lodging Incidence Across Multiple Environments", Jun. 20, 2019, 23 pages.
Thomison et al. "Abnormal Corn Ears", Apr. 28, 2015, 1 page.
Anderson, "Adjust your Combine to Reduce Damage to High Moisture Corn", Aug. 13, 2019, 11 pages.
Sumner et al., "Reducing Aflatoxin in Corn During Harvest and Storage", Reviewed by John Worley, Apr. 2017, 6 pages.
Sick, "Better understanding corn hybrid characteristics and properties can impact your seed decisions", 8 pages, Sep. 21, 2018.
TraCI/Change Vehicle State - SUMO Documentation, 10 pages, Retrieved Dec. 11, 2020.
Arnold, et al., Chapter 8. "Plant Growth Component", Jul. 1995, 41 pages.
Humburg, Chapter: 37 "Combine Adjustments to Reduce Harvest Losses", 2019, South Dakota Board of Regents, 8 pages.
Hoff, "Combine Adjustments", Cornell Extension Bulletin 591, Mar. 1943, 10 pages.
University of Wisconsin, Corn Agronomy, Originally written Feb. 1, 2006 | Last updated Oct. 18, 2018, 2 pages.
University of Nebraska-Lincoln, "Combine Adjustments for Downed Corn—Crop Watch", Oct. 27, 2017, 5 pages.
"Combine Cleaning: Quick Guide To Removing Resistant Weed Seeds (Among Other Things)", Nov. 2006, 5 pages.
Dekalb, "Corn Drydown Rates", 7 pages, Aug. 4, 2020.
Mahmoud et al. Iowa State University, "Corn Ear Orientation Effects on Mechanical Damage and Forces on Concave", 1975, 6 pages.
Sindelar et al., Kansas State University, "Corn Growth & Development" Jul. 17, 2017, 9 pages.
Pannar, "Manage the Growth Stages of the Maize Plant With Pannar", Nov. 14, 2016, 7 pages.
He et al., "Crop residue harvest impacts wind erodibility and simulated soil loss in the Central Great Plains", Sep. 27, 2017, 14 pages.
Blanken, "Designing a Living Snow Fence for Snow Drift Control", Jan. 17, 2018, 9 pages.
Jean, "Drones give aerial boost to ag producers", Mar. 21, 2019, 4 pages.
Zhao et al., "Dynamics modeling for sugarcane sucrose estimation using time series satellite imagery", Jul. 27, 2017, 11 pages.
Brady, "Effects of Cropland Conservation Practices on Fish and Wildlife Habitat", Sep. 1, 2007, 15 pages.
Jasa, et al., "Equipment Adjustments for Harvesting Soybeans at 13%-15% Moisture", Sep. 15, 2017, 2 pages.
Bendig et al., "Estimating Biomass of Barley Using Crop Surface Models (CSMs) Derived from UAV-Based RGB Imaging", Oct. 21, 2014, 18 pages.
Robertson, et al., "Maize Stalk Lodging: Morphological Determinants of Stalk Strength", Mar. 3, 2017, 10 pages.
MacGowan et al. Purdue University, Corn and Soybean Crop Depredation by Wildlife, Jun. 2006, 14 pages.
Martinez-Feria et al., Iowa State University, "Corn Grain Dry Down in Field From Maturity to Harvest", Sep. 20, 2017, 3 pages.
Wrona, "Precision Agriculture's Value" Cotton Physiology Today, vol. 9, No. 2, 1998, 8 pages.
Zhang et al., "Design of an Optical Weed Sensor Using Plant Spectral Characteristics" Sep. 2000, 12 pages.
Hunt, et al., "What Weeds Can Be Remotely Sensed?", 5 pages, May 2016.
Pepper, "Does An Adaptive Gearbox Really Learn How You Drive?", Oct. 30, 2019, 8 pages.
Eggerl, "Optimization of Combine Processes Using Expert Knowledge and Methods of Artificial Intelligence", 10.07.1982, 143 pages.
Sheely et al., "Image-Based, Variable Rate Plant Growth Regulator Application in Cotton at Sheely Farms in California", Jan. 6-10, 2003 Beltwide Cotton Conferences, Nashville, TN, 17 pages.
Kovacs et al., "Physical characteristics and mechanical behaviour of maize stalks for machine development", Apr. 23, 2019, 1- pages.
Anonymously, "Optimizing Crop Profit Across Multiple Grain Attributes and Stover", ip.com, May 26, 2009, 17 pages.
Breen, "Plant Identification: Examining Leaves", Oregon State University, 2020, 8 pages.
Caglayan et al., A Plant Recognition Approach Using Shape and Color Features in Leaf Images, Sep. 2013, 11 pages.
Casady et al., "Precision Agriculture" Yield Monitors University of Missouri-System, 4 pages, 1998.
Apan et al., "Predicting Grain Protein Content in Wheat Using Hyperspectral Sensing of In-season Crop Canopies and Partial Least Squares Regression" 18 pages, 2006.
Xu et al., "Prediction of Wheat Grain Protein by Coupling Multisource Remote Sensing Imagery and ECMWF Data", Apr. 24, 2020, 21 pages.
Day, "Probability Distributions of Field Crop Yields," American Journal of Agricultural Economics, vol. 47, Issue 3, Aug. 1965, Abstract Only, 1 page.
Butzen, "Reducing Harvest Losses in Soybeans", Pioneer, Jul. 23, 2020, 3 pages.
Martin et al., "Relationship between secondary variables and soybean oil and protein concentration", Abstract Only, 1 page., 2007.
Torres, "Precision Planting of Maize" Dec. 2012, 123 pages.
Application and Drawings for U.S. Appl. No. 16/380,623 filed Apr. 10, 2019, 36 pages.
Application and Drawings for U.S. Appl. No. 16/783,511, filed Feb. 6, 2020, 55 pages.
"Automated Weed Detection With Drones" dated May 25, 2017, retrieved at: <<https://www.precisionhawk.com/blog/media/topic/automated-weed-identification-with-drones>>, retrieved on Jan. 21, 2020, 4 pages.
F. Forcella, "Estimating the Timing of Weed Emergence", Site-Specific Management Guidelines, retrieved at: <<http://www.ipni.net/publication/ssmg.nsf/0/D26EC9A906F9B8C9852579E500773936/$FILE/SSMG-20.pdf», retrieved on Jan. 21, 2020, 4 pages.
Chauhan et al., "Emerging Challenges and Opportunities for Education and Research in Weed Science", frontiers in Plant Science. Published online Sep. 5, 2017, 22 pages.
Apan, A., Wells ,N., Reardon-Smith, K, Richardson, L, McDougall, K, and Basnet, B.B., 2008. Predictive mapping of blackberry in the Condamine Catchment using logistic regression and spatial analy-

(56) References Cited

OTHER PUBLICATIONS sis. In Proceedings of the 2008 Queensland Spatial Conference: Global Warning: What's Happening in Paradise. Spatial Sciences Institute.
Jarnevich, C.S., Holcombe, T.R., Barnett, D.T., Stohlgren, T.J. and Kartesz, J.T., 2010. Forecasting weed distributions using climate data: a GIS early warning tool. Invasive Plant Science and Management. 3(4), pp. 365-375.
Sa et al., "WeedMap: A Large-Scale Semantic Weed Mapping Framework Using Aerial Multispectral Imaging and Deep Neural Network for Precision Farming", Septembers, 2018, 25 pages.
Pflanz et al., "Weed Mapping with UAS Imagery and a Bag of Visual Words Based Image Classifier", Published Sep. 24, 2018, 28 pages.
Provisional Application and Drawings for U.S. Appl. No. 62/928,964, filed Oct. 31, 2019, 14 pages.
Application and Drawings for U.S. Appl. No. 16/783,475, filed Feb. 6, 2020, 55 pages.
U.S. Appl. No. 17/067,483 Application and Drawings as filed on Oct. 9, 2020, 63 pages.
U.S. Appl. No. 17/066,442 Application and Drawings as filed on Oct. 8, 2020, 65 pages.
U.S. Appl. No. 16/380,550, filed Apr. 10, 2019, Application and Drawings, 47 pages.
U.S. Appl. No. 17/066,999 Application and Drawings as filed on Oct. 9, 2020, 67 pages.
U.S. Appl. No. 17/066,444 Application and Drawings as filed on Oct. 8, 2020, 102 pages.
Extended Search Report for European Patent Application No. 20167930.5 dated Sep. 15, 2020, 8 pages.
Extended Search Report for European Patent Application No. 19205901.2 dated Mar. 17, 2020, 6 pages.
Notice of Allowance for U.S. Appl. No. 16/171,978, dated Dec. 15, 2020, 21 pages.
Zhigen et al., "Research of the Combine Harvester Load Feedback Control System Using Multi-Signal Fusion Method and Duzzy Algorithm," 2010, Publisher: IEEE.
Dan et al., "On-the-go Througout Prediction in a Combine Harvester Using Sensor Fusion," 2017, Publisher: IEEE.
Dionysis Bochtis et al. "Field Operations Planning for Agricultural Vehicles: A Hierarchical Modeling Framework." Agricultural Engineering International: the CIGR Ejournal. Manuscript PM 06 021. Vol. IX. Feb. 2007, pp. 1-11.
U.S. Appl. No. 16/432,557, filed Jun. 5, 2019, 61 pages.
European Search Report issued in counterpart European Patent Application No. 19205142.3 dated Feb. 28, 2020 (6 pages).
Mei-Ju et al., "Two paradigms in cellular Internet-of-Things access for energy-harvesting machine-to-machine devices push-based versus pull-based," 2016, vol. 6.
M et al., "An Efficient MAC Protocol With Adaptive Energy Harvesting for Machine-to-Machine Networks," 2015, vol. 3, Publisher: IEEE.
Application and Drawings for U.S. Appl. No. 16/171,978, filed Oct. 26, 2018, 53 pages.
Notice of Allowance for U.S. Appl. No. 16/171,978 dated Oct. 28, 2020, 5 pages.
Notice of Allowance for U.S. Appl. No. 16/171,978, dated Aug. 7, 2020, 9 pages.
K.R. Manjunath et al., "Developing Spectral Library of Major Plant Species of Western Himalayas Using Ground Observations", J. Indian Soc Remote Sen (Mar. 2014) 42(a):201-216, 17 pages.
U.S. Appl. No. 16/380,564 Application and Drawings as filed on Apr. 10, 2019, 55 pages.
S. Veenadhari et al., "Machine Learning Approach For Forecasting Crop Yield Based on Climatic Parameters", 2014 International Conference on Computer Communication and Informatics (ICCCI-2014) Jan. 3-6, 2014, Coimbatore, India, 5 pages.
Non-Final Office Action for U.S. Appl. No. 16/380,531 dated Oct. 21, 2020, 10 pages.
U.S. Appl. No. 16/380,531 Application and Drawings as filed on Apr. 10, 2019, 46 pages.
Apan et al., "Predictive Mapping of Blackberry in the Condamine Catchment Using Logistic Regressiona dn Spatial Analysis", Jan. 2008, 12 pages.
Robson, "Remote Sensing Applications for the Determination of Yield, Maturity and Aflatoxin Contamination in Peanut", Oct. 2007, 275 pages.
Bhattarai et al., "Remote Sensing Data to Detect Hessian Fly Infestation in Commercial Wheat Fields", Apr. 16, 2019, 8 pages.
Towery, et al., "Remote Sensing of Crop Hail Damage", Jul. 21, 1975, 31 pages.
Sa et al., "WeedMap: A Large-Scale Semantic Weed Mapping Framework Using Aerial Multispectral Imaging and Deep Neural Network for Precision Farming", Sep. 7, 2018, 25 pages.
Mathyam et al., "Remote Sensing of Biotic Stress in Crop Plants and Its Applications for Pest Management", Dec. 2011, 30 pages.
Martinez-Feria et al., "Evaluating Maize and Soybean Grain Dry-Down In The Field With Predictive Algorithms and Genotype-by-Environmental Analysis", May 9, 2019, 13 pages.
"GIS Maps for Agriculture", Precision Agricultural Mapping, Retrieved Dec. 11, 2020, 6 pages.
Paul, "Scabby Wheat Grain? Increasing Your Fan Speed May Help", https://agcrops.osu.edu/newsletter/corn-newsletter/2015-20/scabby-wheat-grain-increasing-yourfan-speed-may-help, C.O.R.N Newsletter//2015-20, 3 pages.
Clay et al., "Scouting for Weeds", SSMG-15, 4 pages, 2002.
Taylor et al., "Sensor-Based Variable Rate Application for Cotton", 8 pages, 2010.
Christiansen et al., "Designing and Testing a UAV Mapping System for Agricultural Field Surveying", Nov. 23, 2017, 19 pages.
Haung et al., "AccurateWeed Mapping and Prescription Map Generation Based on Fully Convolutional Networks Using UAV Imagery", Oct. 1, 2018, 12 pages.
Morrison, "Should You Use Tillage to Control Resistant Weeds", Aug. 29, 2014, 9 pages.
Morrison, "Snow Trapping Snars Water", Oct. 13, 2005, 3 pages.
"Soil Zone Index", https://www.satimagingcorp.com/applications/natural-resources/agricultu..., Retrieved Dec. 11, 2020, 5 pages.
Malvic, "Soybean Cyst Nematode", University of Minnesota Extension, Oct. 19, 2020, 3 pages.
Unglesbee, "Soybean Pod Shatter—Bad Enough to Scout Before Harvest?—DTN", Oct. 17, 2018, 4 pages.
Tao, "Standing Crop Residue Can Reduce Snow Drifting and Increase Soil Moisture", 2 pages, last accessed Jul. 14, 2020.
Berglund, et al., "Swathing and Harvesting Canola", Jul. 2019, 8 pages.
Bell et al., "Synthetic Aperture Radar and Optical Remote Sensing of Crop Damage Attributed To Severe Weather in the Central United States", Jul. 25, 2018, 1 page.
Rosencrance, "Tabletop Grapes in India to Be Picked by Virginia Tech Robots", Jul. 23, 2020, 8 pages.
Lofton, et al., The Potential of Grazing Grain Sorghum Residue Following Harvest, May 13, 2020, 11 pages.
Beal et al., "Time Shift Evaluation to Improve Yield Map Quality", Published in Applied Engineering in Agriculture vol. 17(3): 385-390 (©2001 American Society of Agricultural Engineers), 9 pages.
"Tips and Tricks of Harvesting High Moisture Grain", https://www.koenigequipment.com/blog/tips-and-tricks-of-harvesting-highmoisture-grain, 7 pages, last accessed Jul. 14, 2020.
Ransom, "Tips for Planting Winter Wheat and Winter Rye (for Grain) (Aug. 15, 2019)", 2017, 3 pages.
AgroWatch Tree Grading Maps, "The Grading Maps and Plant Count Reports", https://www.satimagingcorp.com/applications/natural-resources/agricultu..., Retrieved Dec. 11, 2020, 4 pages.
Ackley, "Troubleshooting Abnormal Corn Ears", Jul. 23, 2020, 25 pages.
Smith, "Understanding Ear Flex", Feb. 25, 2019, 17 pages.
Carroll et al., "Use of Spectral Vegetation Indicies Derived from Airborne Hyperspectral Imagery For Detection of European Corn Borer Infestation in Iowa Corn Plots", Nov. 2008, 11 pages.
Agriculture, "Using drones in agriculture and capturing actionable data", Retrieved Dec. 11, 2020, 18 pages.

(56) References Cited

OTHER PUBLICATIONS

Bentley et al., "Using Landsatto Identify Thunderstorm Damage in Agricultural Regions", Aug. 28, 2001, 14 pages.
Duane Grant and the Idaho Wheat Commission, "Using Remote Sensing to Manage Wheat Grain Protein", Jan. 2, 2003, 13 pages.
Zhang et al., "Using satellite multispectral imagery for damage mapping of armyworm (*Spodoptera frugiperda*) in maize at a regional scale", Apr. 10, 2015, 14 pages.
Booker, "VIDEO: Canadian cage mill teams up with JD", Dec. 19, 2019, 6 pages.
AgTalk Home, "Best Combine to Handle Weeds", Posted Nov. 23, 2018, 9 pages.
"Volunteer corn can be costly for soybeans", Jun. 2, 2016, 1 page.
Pflanz, et al., "Weed Mapping with UAS Imagery and a Bag of Visual Words Based Image Classifier", Published Sep. 24, 2018, 17 pages.
Hartzler, "Weed seed predation in agricultural fields", 9 pages, 2009.
Sa et al., "Weedmap: A Large-Scale Sematnic Weed Mapping Framework Using Aerial Multispectral Imaging and Deep Neural Netowrk for Precision Farming", Sep. 6, 2018, 25 pages.
Nagelkirk, Michigan State University-Extension, "Wheat Harvest: Minimizing the Risk of Fusarium Head Scab Losses", Jul. 11, 2013, 4 pages.
Saskatchewan, "Wheat: Winter Wheat", (https://www.saskatchewan.ca/business/agriculture-natural-resources-and-industry/agribusiness-farmers-and-ranchers/crops-and-irrigation/field-crops/cereals-barley-wheat-oats-triticale/wheat-winter-wheat) 5 pages, last accessed Jul. 14, 2020.
Quora, "Why would I ever use sport mode in my automatic transmission car? Will this incrase fuel efficiency or isit simply a feature that makes form more fun when driving?", Aug. 10, 2020, 5 pages.
Wade, "Using a Drone's Surface Model to Estimate Crop Yields & Assess Plant Health", Oct. 19, 2015, 14 pages.
Mathyam et al., "Remote Sensing of Biotic Stress in Crop Plants and Its Applications for Pest Stress", Dec. 2011, 30 pages.
"Four Helpful Weed-Management Tips for Harvest Time", 2 pages, Sep. 4, 2019.
Franz et al., "The role of topography, soil, and remotely sensed vegetation condition towards predicting crop yield", University of Nebraska—Lincoln, Mar. 23, 2020, 44 pages.
Peiffer et al., The Genetic Architecture of Maize Stalk Strength:, Jun. 20, 2013, 14 pages.
7 Combine Tweaks to Boost Speed (https://www.agriculture.com/machinery/harvest-equipment/7-combine-tweaks-to-boost-speed_203-ar33059) 8 pages, Aug. 19, 2018.
Managing corn harvest this fall with variable corn conditions (https://www.ocj.com/2019/10/managing-corn-harvest-this-fall-with-variable-corn-conditions/), 4 pages, Oct. 10, 2019.
Reducing Aflatoxin in Corn During Harvest and Storage (https://extension.uga.edu/publications/detail.html?number=B1231&title=Reducing%20Aflatoxin%20in%20Corn%20During%20Harvest%20and%20Storage), 9 pages, Published with Full Review on Apr. 19, 2017.
Variable Rate Applications to Optimize Inputs (https://www.cotton.org/tech/physiology/cpt/miscpubs/upload/CPT-v9No2-98-REPOP.pdf), 8 pages, Nov. 2, 1998.
Robin Booker, VIDEO: Canadian cage mill teams up with JD (https://www.producer.com/2019/12/video-canadian-cage-mill-teams-up-with-jd/) , 6 pages, Dec. 19, 2019.
Jarnevich, et al. "Forecasting Weed Distributions using Climate Data: A GIS Early Warning Tool", Invasive Plant Science and Management, 11 pages, Jan. 20, 2017.
Burks, "Classification of Weed Species Using Color Texture Features and Discriminant Analysis" (http://citeseerx.ist.psu.edu/viewdoc/download?doi=10.1.1.468.5833&rep=rep1&type=pdf), 8 pages, 2000.
John Deere, https://www.youtube.com/watch?v=1Gq77CfdGI4&list=PL1KGsSJ4CWk4rShNb3-sTMOIiL8meHBL5 (last accessed Jul. 14, 2020), Jun. 15, 2020, 5 pages.
Combine Adjustments (http://corn.agronomy.wisc.edu/Management/L036.aspx), 2 pages, Originally written Feb. 1, 2006; last updated Oct. 18, 2018.
Ardekani, "Off- and on-ground GPR techniques for field-scale soil moisture mapping" Jun. 2013, 13 pages.
Does an Adaptive Gearbox Really Learn How You Drive? (https://practicalmotoring.com.au/voices/does-an-adaptive-gearbox-really-leam-how-you-drive/), Oct. 30, 2019, 8 pages.
https://www.researchgate.net/publication/222527694_Energy_Requirement_Model_for_a_Combine_Harvester_Part_1_Development_of_Component Models, Abstract Only, Jan. 2005.
http://canola.okstate.edu/cropproduction/harvesting, 8 pages, Aug. 2011.
"Tips and Tricks of Harvesting High Moisture Grain", https://www.koenigequipment.com/blog/tips-and-tricks-of-harvesting-highmoisture-grain, 5 pages, last accessed Feb. 11, 2021.
Hoff, Combine Adjustements, Mar. 1943, 8 pages.
Haung et al., "Accurate Weed Mapping and Prescription Map Generation Based onFully Convolutional Networks Using UAV Imagery", 14 pages, Oct. 1, 2018.
Thompson, "Morning glory can make it impossible to harvest corn", Feb. 19, 2015, 4 pages.
Liu, R. and Bai, X., May, 2014, Random fuzzy production and distribution plan of agricultural products and its PSO algorithm. In 2014 IEEE International Conference on Progress in Informatics and Computing (pp. 32-36). IEEE.
Notice of Allowance for U.S. Appl. No. 16/432,557 dated Mar. 22, 2021, 9 pages.
Zhao, L., Yang, J., Li, P. and Zhang, L., 2014. Characteristics analysis and classification of crop harvest patterns by exploiting high-frequency multipolarization SAR data. IEEE Journal of Selected Topics in Applied Earth Observations and Remote Sensing, 7(9), pp. 3773-3783.
Feng-Jie, X., Er-da, W. and Feng-yuan, X., Crop area yield risk evaluation and premium rates calculation—Based on nonparametric kernel density estimation. In 2009 International Conference on Management Science and Engineering, 7 pages.
Prosecution History for U.S. Appl. No. 16/380,691 including: Notice of Allowance dated Mar. 10, 2021 and Application and Drawings filed Apr. 10, 2019, 46 pages.
U.S. Appl. No. 16/831,216 Application and Drawings filed Mar. 26, 2020, 56 pages.
Notice of Allowance for U.S. Appl. No. 16/380,531 dated Apr. 5, 2021, 5 pages.
Application and Drawings for U.S. Appl. No. 17/067,383, filed Oct. 9, 2020, 61 pages.
DE Application No. 19 203 883.4-1004 dated May 3, 2021 Communication pursuant to Article 94(3) EPC, 4 pages.
Lamsal et al. "Sugarcane Harvest Logistics in Brazil" Iowa Research Online, Sep. 11, 2013, 27 pages.
Jensen, "Algorithms for Operational Planning of Agricultural Field Operations", Mechanical Engineering Technical Report ME-TR-3, Nov. 9, 2012, 23 pages.
Chauhan, "Remote Sensing of Crop Lodging", Nov. 16, 2020, 16 pages.
Htips://www.pioneer.com/home/site/US/tools-apps/growing-lools/corn-yield-estimator/, 1 page, Accessed on Feb. 13, 2018.
Estimating Maize Grain Yield from Crop Biophysical Parameters Using Remote Sensing by Noemi Guindin, Nov. 4, 2013 (accessed Oct. 24, 2017 4:40 Pm CDT from https://www.nass.usda.gov/Education_and_Outreach/Reports,_Presentations_and_Conferences/Presentations/Guindin_ASA13_Yield.pdf, 19 pages.
Extended European Search Report and Written Opinion issued in European Patent Application No. 20208171.7, dated May 11, 2021, in 05 pages.
Cordoba, M.A., Bruno, C.l. Costa, J.L. Peralta, N.R. and Balzarini, M.G., 2016, Protocol for multivariate homogeneous zone delineation in precision agriculture, biosystems engineering, 143, pp. 95-107.
Fernandez-Quintanilla et al., "Is the current state of the art of weed monitoring, sutible for site-specific weed management in arable crops?", First Published May 1. 2018, 4 pages.

(56) References Cited

OTHER PUBLICATIONS

European Search Report issued in European Patent Application No. 19203883.4 dated Mar. 23, 2020.(10 pages).
Application and Drawings for U.S. Appl. No. 16/175,993, filed Oct. 31, 2018, 28 pages.
Non-Final Office Action for U.S. Appl. No. 16/380,531 dated Oct. 21, 2020, 9 pages.
U.S. Appl. No. 16/380,531 Application and prawings as filed on Apr. 10, 2019, 46 pages.

* cited by examiner

CONTROLLING A HARVESTING MACHINE BASED ON A GEO-SPATIAL REPRESENTATION INDICATING WHERE THE HARVESTING MACHINE IS LIKELY TO REACH CAPACITY

FIELD OF THE DESCRIPTION

The present description relates to a mobile harvesting machine. More specifically, the present description relates to controlling a mobile harvesting machine based on a geo-spatial indication of where in a field the harvesting machine may reach its capacity.

BACKGROUND

There are many different types of mobile machines. There are also many different types of mobile machines that have local material storage repositories that store material that is gathered, or that is distributed, by the machine.

For instance, in one example, an agricultural harvester, such as a combine harvester, harvests material, such as grain. In harvesting grain, it processes the grain and stores it in a clean grain tank. When the clean grain tank is full, the combine harvester unloads the clean grain into a haulage unit, which may be a grain cart pulled by a tractor. The haulage unit then often transports the harvested grain to another vehicle, such as a semi-truck for transport to a different location.

Other examples of mobile work machines that collect material include machines such as a sugarcane harvester, a forage harvester, a baler, a timber harvester, an asphalt milling machine, a scraper, among a wide variety of other machines.

With these types of machines, logistical efficiency can be desirable. For instance, if a combine harvester reaches its full capacity at some point in a field, and there is no haulage unit nearby, then the combine harvester sits idle, waiting to unload its clean grain tank, until a haulage unit arrives. This increases the inefficiency of the combine harvester, and of the overall harvesting operation.

Similarly, in a given harvesting operation, there may be multiple different combine harvesters operating in a single field, along with multiple different haulage units. If the haulage units go to the wrong harvester (e.g., if they go to a harvester that is not yet at its full capacity, while a different harvester is already at its full capacity), this can also raise the inefficiency of the operation. Further, it may be that the operators of the haulage units do not know when a particular combine harvester is reaching its capacity.

Machines that distribute material often also have a local repository that stores the material to be distributed. Such agricultural machines include sprayers or other vehicles that apply fertilizer or other chemicals to a field. In operation, the sprayer is often loaded with fertilizer or another chemical and distributes it on a field. When the local storage repository (e.g., the tank) becomes empty, the sprayer or the other vehicle must have more fertilizer or chemical loaded into it.

The discussion above is merely provided for general background information and is not intended to be used as an aid in determining the scope of the claimed subject matter.

SUMMARY

A georeferenced probability distribution is generated indicating a probability that a harvester will reach its full capacity at different locations in a field. A control signal is generated to control the harvester based upon the georeferenced probability distribution. The control signal is used to control one of a plurality of different controllable subsystems, such as the propulsion system (to control harvester speed), a steering subsystem (to control the harvester's path), or other controllable subsystems.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

With current combine harvesters, it can be difficult to tell when the clean grain tank is full. It can be even more difficult to predict, where, in the field that is being harvested, the clean grain tank will be full so that a haulage unit can rendezvous with the harvesting machine, at that point, or just prior to that point. Thus, it can be difficult to deploy harvesting machines and haulage units in an efficient manner. The present description thus proceeds with respect to a system in which a yield estimate is received for a field being harvested. The yield estimate can also include an error estimate indicative of a likely error in the yield estimate. The yield estimate and its corresponding error are used to generate a georeferenced probability distribution indicative of different locations where the grain tank on the harvester will likely be full. A control system generates control signals to control different portions of the harvester, based upon the georeferenced probability distribution. This greatly enhances the operation of the harvester, in that it reduces the time that the harvester may be idle and waiting to unload. In addition, the harvester can be automatically controlled to take a path, or to travel at a ground speed, based on a desired rendezvous point with a haulage unit.

The same types of operations can be performed with work other machines that collect material, such as other harvesters, asphalt milling machines, scrapers, etc. The same types of operations can also be performed with respect to machines that distribute material, such as fertilizer or chemical application equipment. In those machines, it can be difficult to know where on a worksite the tank will be empty and need to be refilled. It can also be difficult to know where to rendezvous with a haulage unit used to refill the tank.

These are just examples how of the present description can be applied, and additional examples are provided below, all of which are contemplated herein.

Figure 1:
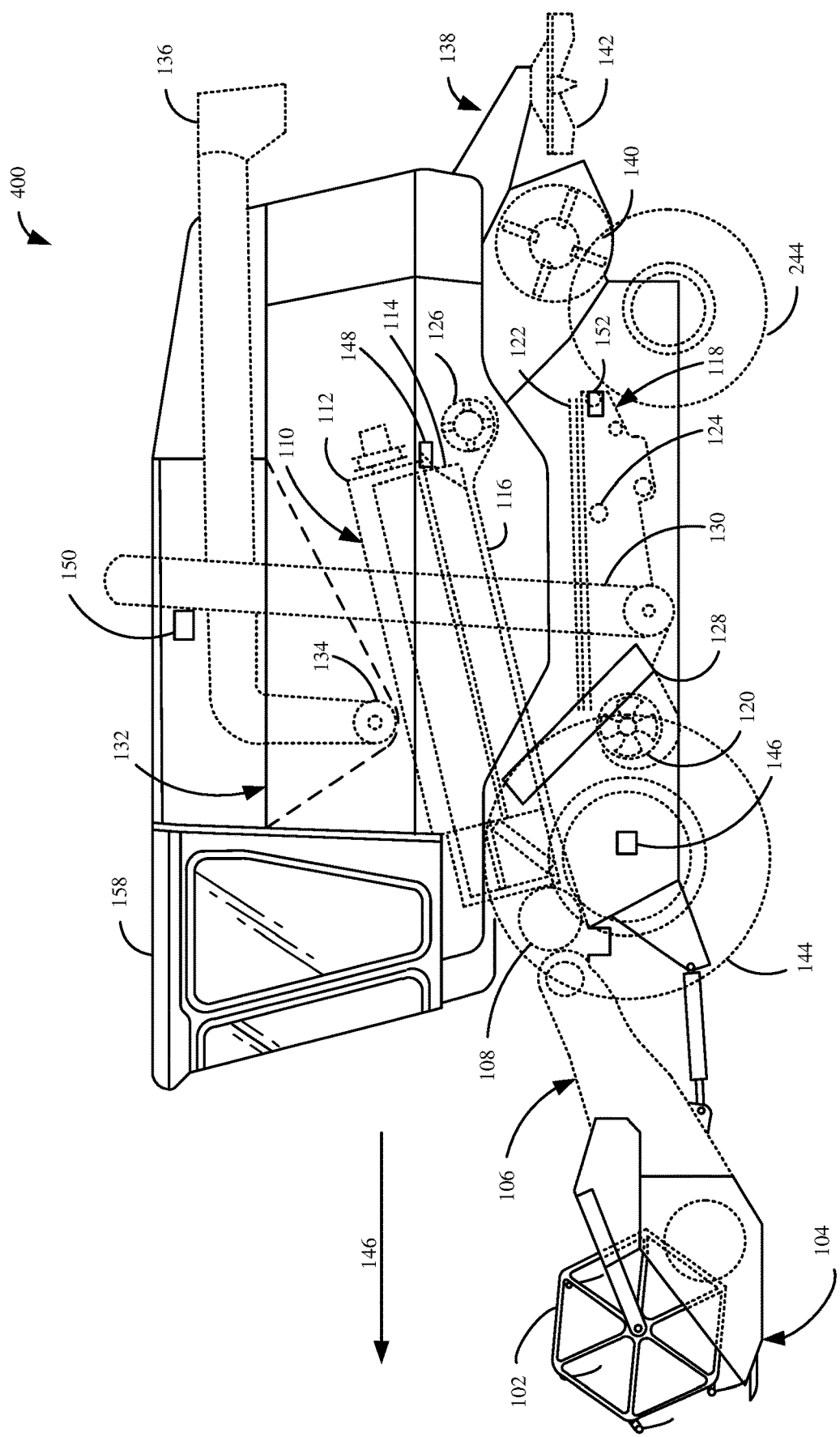
FIG. 1 is a partial pictorial, partial schematic view of one example of an agricultural harvesting machine (a combine harvester).

FIG. 1 is a partial pictorial, partial schematic, illustration of an agricultural machine 100, in an example where machine 100 is a combine harvester (or combine). It can be seen in FIG. 1 that combine 100 illustratively includes an operator compartment 101, which can have a variety of different operator interface mechanisms, for controlling combine 100. Combine 100 can include a set of front end equipment that can include header 102, and a cutter generally indicated at 104. It can also include a feeder house 106, a feed accelerator 108, and a thresher generally indicated at 110. Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. After it is cut, it is moved through a conveyor in feeder house 106 toward feed accelerator 108, which accelerates the crop into thresher 110. The crop is threshed by rotor 112 rotating the crop against concaves 114. The threshed crop is moved by a separator rotor in separator 116 where some of the residue is moved by discharge beater 126 toward the residue subsystem 138. It can be chopped by residue chopper 140 and spread on the field by spreader 142. In other configurations, the residue is simply chopped and dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. Cleaning fan 120 directs air along an airflow path upwardly through the sieves and chaffers and the airflow carries residue can also be rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 147 illustratively senses the travel speed of combine 100 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, they can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation of combine 100. Crop property sensors can sense a variety of different types of crop properties, such as crop type, crop moisture, and other crop properties. They can also be configured to sense characteristics of the crop as they are being processed by combine 100. For instance, they can sense grain feed rate, as it travels through clean grain elevator 130. They can sense mass flow rate of grain through elevator 130, or provide other output signals indicative of other sensed variables. Some additional examples of the types of sensors that can be used are described below.

Figure 2:
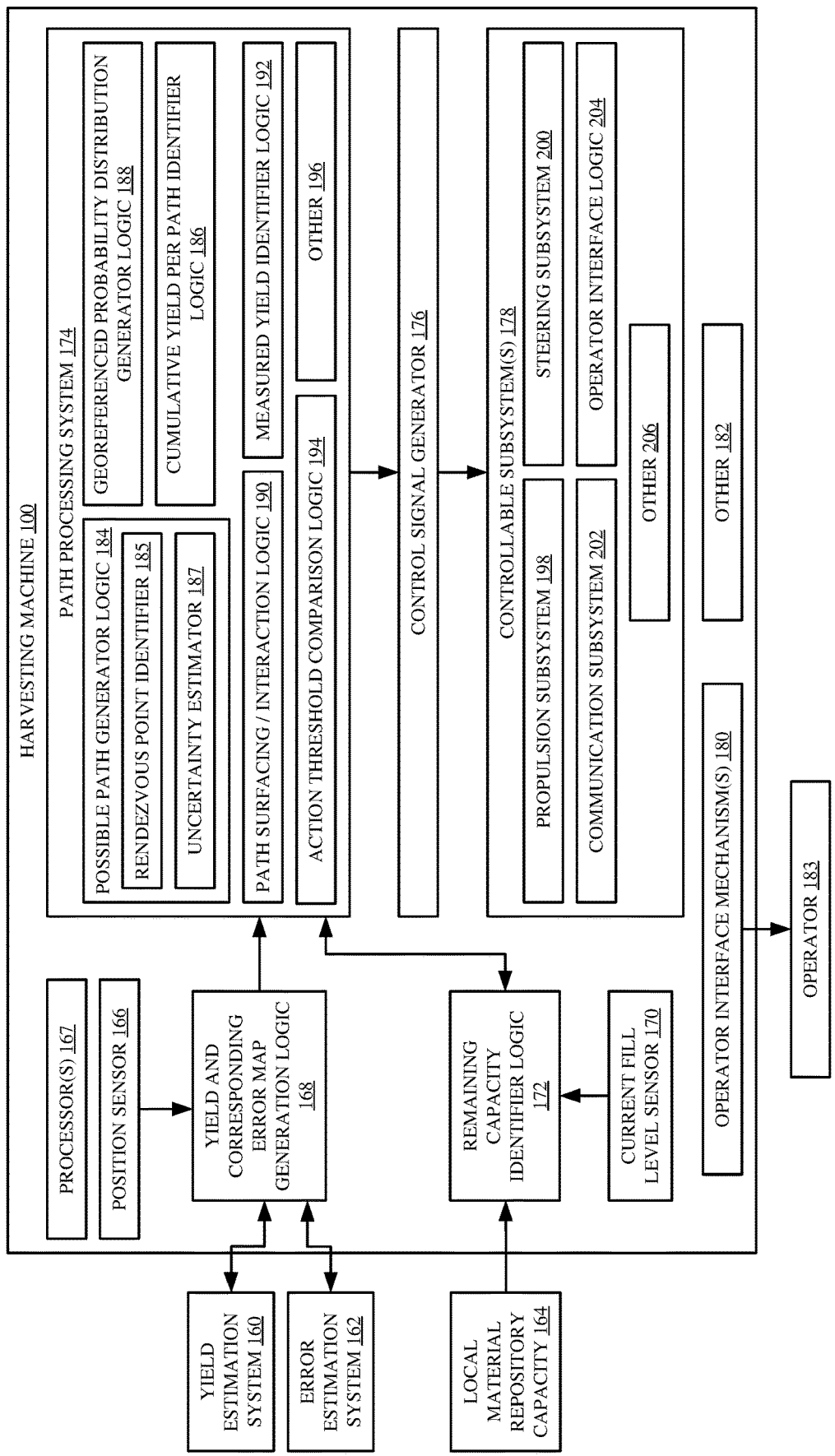
FIG. 2 is a block diagram showing one example of different portions of the harvesting machine illustrated in FIG. 1, in more detail.

FIG. 2 is a block diagram showing one example of a portion of harvesting machine (or combine) 100, in more detail. In the example shown in FIG. 2, machine 100 is also shown receiving an input from yield estimation system 160, and error estimation system 162. It receives an input indicating the capacity of local material repository (e.g., the capacity of clean grain tank 132). The capacity input is indicated by block 164 in the block diagram of FIG. 2. It will be appreciated that systems 160 and 162, and capacity indicator 164, can all be on machine 100. They are shown separately for the sake of example only.

Also, FIG. 2 shows that, in one example, machine 100 includes position sensor 166, processor(s) 167, yield and corresponding error map generation logic 168, current fill level sensor 170, remaining capacity identifier logic 172, path processing system 174, control signal generator 176, controllable subsystems 178, operator interface mechanisms 180, and it can include a wide variety of other items 182. Path processing system174 illustratively includes possibly path generator logic 184 (which can include rendezvous point identifier logic 185 and uncertainty estimator 187 and other items 189), cumulative yield per path identifier logic 186, georeferenced probability distribution generator logic 188, path surfacing/interaction logic 190, measured yield identifier logic 192, action threshold comparison logic 194, and it can include other items 196. Controllable subsystems 178 can include propulsion subsystem 198, steering subsystem 200, communication subsystem 202, operator interface logic 204, and it can include other items 206. The other items can include such things as the material handling subsystem, the cleaning subsystem, and the residue subsystem all discussed above with respect to FIG. 1. Before describing the operation of harvesting machine 100 in more detail, a brief description of some of the items illustrated in FIG. 2, and their operation, will first be provided.

Yield estimation system 160 illustratively generates an estimate of yield at different geographic locations in the field being harvested by machine 100. The yield estimation system 160 can take a wide variety of different forms and illustratively provides a georeferenced a priori estimate of yield. The estimating techniques can include a wide variety of different techniques such as in-season remote sensing, sampling ears from individual plants and extrapolating results across the field, and crop modeling. Yield estimation system 160 may include near real time sensing which may include, for instance, on-board image capture devices (which capture images ahead of machine 100, or to the sides of machine 100) and corresponding image processing logic that processes the images to identify an estimated yield. The on-board system may include other types of perception systems as well, such as LIDAR, stereo cameras, etc. In another example, yield estimation system 160 can include a system that receives aerial images that are processed to generate normalized different vegetative index (NDVI) or leaf area index (LAI) at a particular growth stage, and uses one or more of those indices to estimate harvested yield. Yield estimation system 160 can also include real time yield sensors, which sense the current yield (such as the mass flow rate of grain through machine 100, or other sensors indicative of yield) and correct the forward-looking yield estimates in the field, and particularly in the path over which machine 100 is traveling. These and other types of yield estimation systems are contemplated herein.

Error estimation system 162 illustratively estimates an error corresponding to the yield estimate generated by system 160. In some examples, the error may be assumed to be 0%. In other examples, the error may be georeferenced and based on factors such as sensor signals, model outputs, or other sources of information used to predict or estimate the yield. It may also be based on factors such as the time since a last ground-truthed data collection was performed, historical differences between predicted and measured yield for this location, environmental conditions or other factors which may result in a difference between the estimated yield provided by system 160 and the actual measured yield at a particular location.

Where statistical techniques are used by yield estimation system 160 in order to generate an estimated yield value, then estimated error distributions may be determined along with the expected yield values. Where perception systems are used by yield estimation system 160, then error may be estimated based on historic differences between the estimated and measured yields. The history may be from prior harvest at this or other locations, from the current harvesting operation or a combination of the two data sets. Environmental factors, such as obscurants (e.g. dust, rain, snow, etc.), lighting and crop stand attributes may also be used by error estimation system 162 in order to generate a georeferenced estimate of error corresponding to the yield estimate output by yield estimation system 160.

Local material repository capacity 164 may be a value that is stored on harvesting machine 100, itself. It is illustratively indicative of the overall capacity of the clean grain tank on machine 100. It can also be a value that is stored at a remote location, and accessed by communication system 202 when harvesting machine 100 starts, or is about to start, its operation.

Position sensor 166 can be any of a wide variety of different types of position sensors such as a global positioning system (GPS) receiver, a dead reckoning system, or a wide variety of other systems that provide an indication of a current geographic location of harvesting machine 100. They can provide orientation, ground speed and other information as well.

Current fill level sensor 170 illustratively senses a fill level in the local material repository (e.g., the clean grain tank) on harvesting machine 100. It can be any of a wide variety of different level sensors, such as an optical sensor, a weight or mass sensor, a mass flow sensor that measures the amount of material entering clean grain tank 132 since it was last emptied, etc.

Yield and corresponding error map generation logic 168 illustratively generates a georeferenced yield estimate, along with a georeferenced error estimate. This is illustratively a georeferenced predicted yield map for at least a portion of the field over which harvester 100 is traveling, along with an error estimate corresponding to the georeferenced predicted yield. In one example, the georeferenced yield and corresponding error map is generated with a resolution that corresponds to segments along a travel path of harvesting machine 100. For instance, where harvesting machine 100 harvests 12 rows at a time, then the georeferenced yield and corresponding error map will illustratively output estimated yield and error values for geographic locations that are 12 rows wide and a certain row length (e.g., 10 meters in linear row length). Of course, these values are examples only and the width of the path of harvesting machine 100, and the length of the segments for which a yield and corresponding error is estimated can vary widely. In one example, they can be controlled or varied based on user inputs or otherwise. The yield and corresponding error map are output by logic 168 to path processing system 174.

Remaining capacity identifier logic 172 illustratively generates a value indicative of a remaining capacity in the local material repository (e.g., the clean grain tank 132) on harvesting machine 100. This value is illustratively updated as machine 100 continues to operate, performing the harvesting operation and filling its clean grain tank.

Possible path generator logic 184 identifies a number of different, possible geographic paths of harvesting machine 100 through the field over which it is harvesting. In doing so, it illustratively takes into account the width of the harvesting head on machine 100, crop that has already been harvested, the geographic location of any other harvesters or machines in the field, etc. It correlates the possible paths to the georeferenced yield and corresponding error map generated by logic 168. Therefore, it identifies geographic locations or routes, on that map, that correspond to different paths that harvester 100 can take.

As is described in greater detail below, rendezvous point identifier logic 185 can identify different rendezvous points where harvester 100 can meet one or more haulage units in the field. This can be based on the location and fill status (full, empty, unloading, waiting to unload, etc.) of the haulage units, the location of harvester 100, the speed of the vehicles, the routes, field terrain, etc. Uncertainty estimator 187 generates an uncertainty level corresponding to each rendezvous point. The uncertainty level accounts for various uncertainties in identifying the rendezvous points.

Cumulative yield per path identifier logic 186 identifies the cumulative yield that harvester 100 will encounter, as it travels over the different paths identified by logic 184. For instance, it may be that the possible paths output by logic 184 have corresponding estimated yields, in 10-meter segments along the path. Therefore, as harvester 100 travels along a given path, the yield it has encountered will accumulate, with each harvested segment. Therefore, cumulative yield per path identifier logic 186 identifies the cumulative yield that will be encountered by harvester 100, as it travels along each of the possible paths output by logic 184.

Georeferenced probability distribution generator logic 188 then generates a georeferenced probability distribution indicative of the probability that the local material repository (e.g., the clean grain tank) will reach its capacity at different geographic locations along the field. It will do this for each path output by logic 184, based upon the cumulative yield output by logic 186.

Path surfacing interaction logic 190 then surfaces the various paths, along with the probability distributions, for user interaction. In one example, the user can select one of the paths and the machine 100 will be automatically controlled to follow that path. In another example, the operator can provide inputs to control machine 100 to travel along one of the paths. These and other operations can be performed, some of which are described in more detail below.

Measured yield identifier logic 192 measures the actual yield encountered by harvester 100. This value can be fed back to yield estimation system 160, or error estimation system 162 in order to correct the yield estimate, or the error estimate. These corrected values can then be used by logic 168 to generate an updated yield and corresponding error map.

Action threshold comparison logic 194 illustratively allows action thresholds to be set given the georeferenced probability distribution output by logic 188. For instance, it may be that, if the probability that the clean grain tank is full exceeds a certain threshold, an alert may be generated using operator interface mechanisms 180 for operator 183. Other action thresholds can be set and used to perform other operations as well, and some of them are described in more detail below.

Based on the various information generated by path processing system 174, control signal generator 176 generates control signals that are applied to controllable subsystems 178. For instance, control signal generator 176 can generate control signals to control propulsion subsystem 198 to control the speed of harvesting machine 100. By way of example, if harvesting machine 100 is going to be full relatively quickly, but it will take a haulage unit a longer amount of time to reach it and unload it, then control signal generator 176 can control propulsion subsystem 198 to slow down harvesting machine 100. This may reduce grain losses and it may increase the likelihood that the haulage unit will be able to travel to harvesting machine 100 before harvesting machine 100 has reached it capacity. In another example, if the georeferenced probability distribution indicates that, given the path harvesting machine 100 is taking, it will not be full before a haulage unit reaches it, then control signal generator 176 may generate control signals to control propulsion subsystem 198 to increase the speed of harvesting machine 100 so that it can harvest more crop, and be closer to its capacity, when a haulage unit reaches it. These are examples only.

Control signal generator 176 can also generate control signals to control steering subsystem 200. For instance, it may be that operator 183 selects a possible path that is output by path processing system 174. In that case, control signal generator 176 can control steering subsystem 200 to steer harvesting machine 100 along the selected path.

Control signal generator 176 can also control communication subsystem 202 to communicate various information within harvesting machine 100 or to one or more remote systems. The remote systems may be able to connect with communication subsystem 202 over a network, such as a cellular communication network, a wide area network, a local area network, a near field communication network, or a wide variety of other networks or combinations of networks.

Control signal generator 176 can also generate control signals to control operator interface logic 204. The operator interface logic 204 can control operator interface mechanisms 180, and receive operator interactions through those mechanisms. Operator interface mechanisms 180 may include such things as a steering wheel, joystick, levers, pedals, linkages, buttons, switches, and other such mechanisms. It can also include such things as a touch sensitive display screen so that user input mechanisms can be displayed, and actuated by operator 183, using touch gestures. Mechanisms 180 can include a microphone and corresponding speech recognition system, as well as a speaker and corresponding speech synthesis system. Operator interface mechanisms 180 can include a wide variety of other mechanical, electromechanical, visual, audio or haptic systems as well. Those mentioned are mentioned for the sake of example only.

Figure 3A:
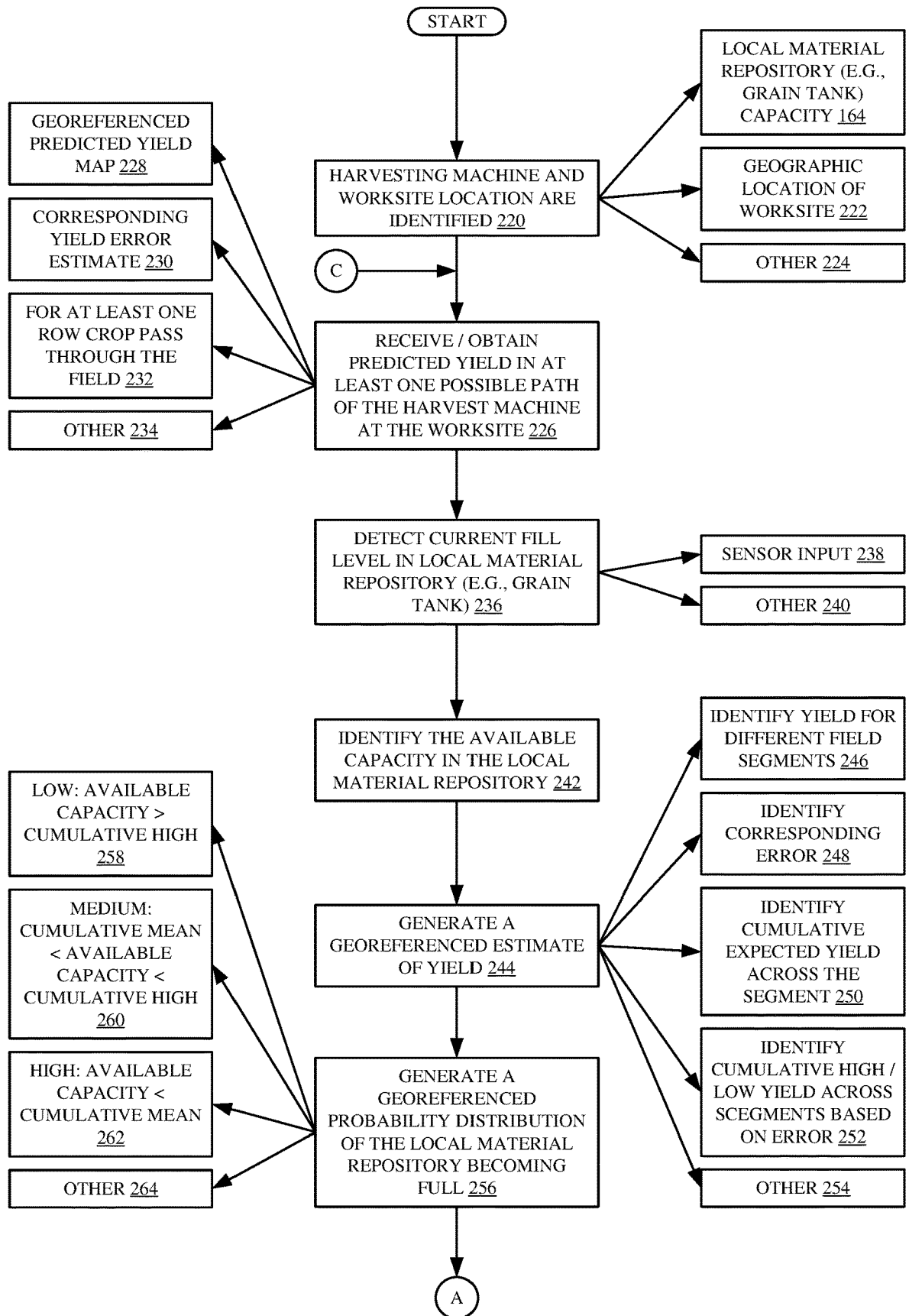
FIGS. 3A and 3B (collectively referred to herein as FIG. 3) show a flow chart illustrating one example of the operation of a harvesting machine.
Figure 3B:
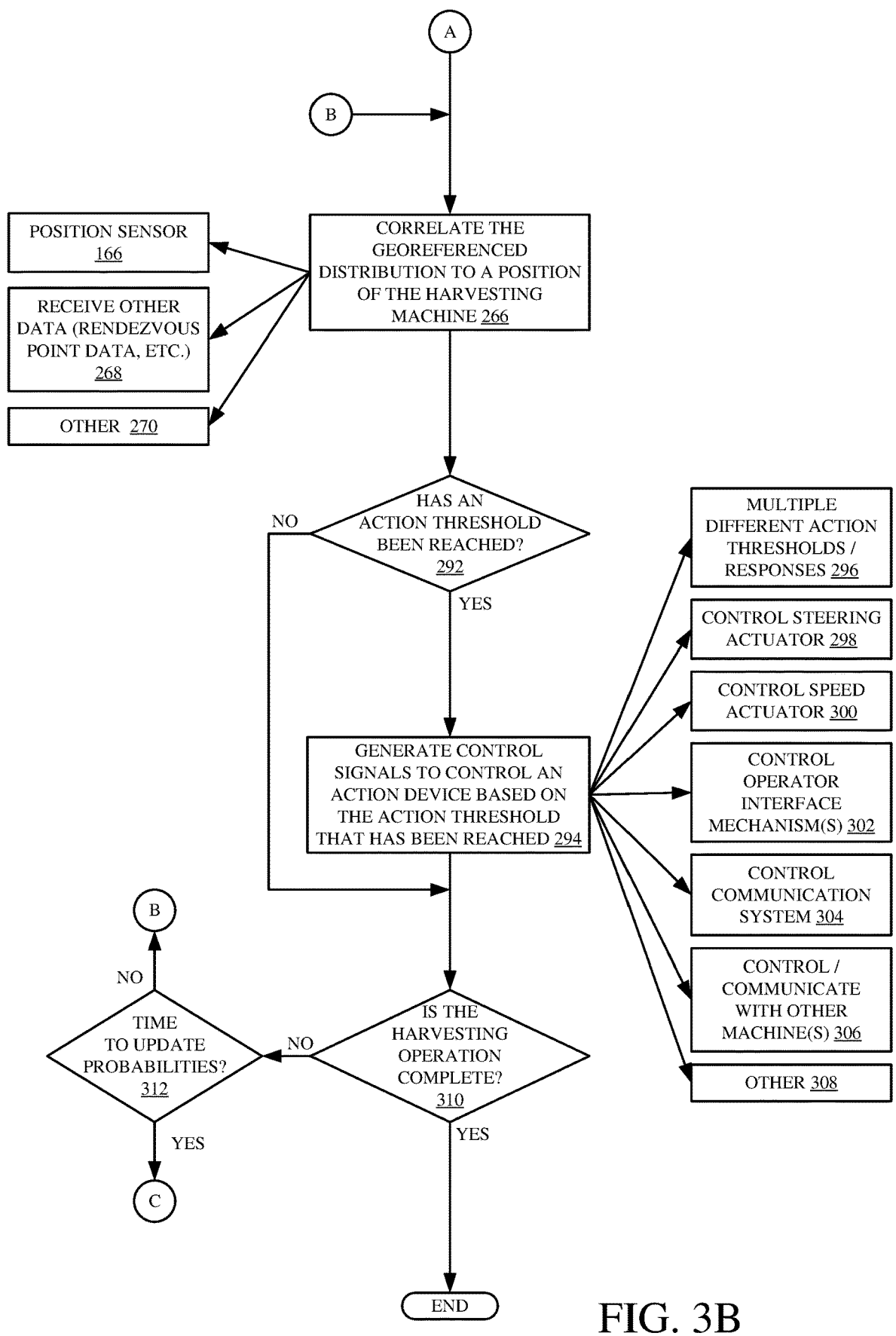

FIGS. 3A and 3B show a flow diagram illustrating one example of the operation of harvesting machine 100 in generating action signals based upon a georeferenced probability distribution indicating a georeferenced probability of the local material repository (e.g., clean grain tank 132) on machine 100 reaching its capacity. It is first assumed that harvesting machine 100 and the worksite location (e.g., the field to be harvested) are identified. This is indicated by block 220 in the flow diagram of FIG. 3. In one example, the information identifying the particular harvesting machine 100 also includes the local material repository capacity information 164. It can include the geographic location of the field to be harvested, as indicated by block 222, and it can include a wide variety of other things, as indicated by block 224.

Yield and corresponding error map generation logic 168 then receives or obtains a predicted yield for at least one possible path of harvesting machine 100 at the worksite or field being harvested. This is indicated by block 226. In one example, logic 168 outputs a georeferenced predicted yield map which identifies predicted yield at different geographical locations within the field. This is indicated by block 228. It can be based on the yield estimate received from yield estimation system 160.

Logic 168 can also output a georeferenced yield error estimate which identifies an estimate of error at the geographic locations within the field, for which the yield has been estimated. This can be based on the error estimate received from error estimation system 162. Outputting the corresponding yield error estimate is indicated by block 230 in the flow diagram of FIG. 3.

The georeferenced yield and corresponding error map can be output for at least one path (or possible path) of harvesting machine 100 through the field or worksite where it is harvesting. This is indicated by block 232. It will be appreciated that it can be output for multiple different paths as well, or in other ways. This is indicated by block 234.

Remaining capacity identifier logic 172 also receives a current fill level of the local material repository (e.g. the grain tank). This is indicated by block 236 in the flow diagram of FIG. 3. This can be based on a sensor input 238 from current fill level sensor 170, or it can be obtained in other ways, as indicated by block 240. Remaining capacity identifier logic 172 then identifies the available capacity (or remaining capacity) in the local material repository (in the grain tank). This is indicated by block 238. For instance, the current fill level (or measured amount) of material in the grain tank can be subtracted from the capacity of the repository to give the remaining capacity.

Possible path generator logic 184 identifies one or more different possibly paths of machine 100 through the field being harvested. It correlates those paths with the yield and corresponding error map generated by logic 168. Cumulative yield per path identifier logic 186 then identifies the cumulative yield, for different sections along each of the identified paths. The cumulative high yield (given the expected yield plus an amount corresponding to the identified error) and the cumulative low yield (given the expected yield minus an amount corresponding to the estimated error) can be generated for each path as well. Generating a georeferenced estimate of yield is indicated by block 244. Identifying the yield for different field segments is indicated by block 246 and identifying the corresponding error is indicated by block 248. Identifying cumulative expected yield across different segments along one or more different possible paths for machine 100 is indicated by block 250. Identifying the cumulative high and low yield values across those segments, based upon the estimated error value, is indicated by block 252. The georeferenced estimate of yield can be generated in a wide variety of other ways as well, and this is indicated by block 254.

Table 1 illustrates one example of this in more detail.

TABLE 1

| Line | Value | Seg 1 | Seg 2 | Seg 3 | Seg 4 | Seg 5 |
| --- | --- | --- | --- | --- | --- | --- |
| 1 | Estimated Yield (bu) | 50.0 | 60.0 | 55.0 | 50.0 | 45.0 |
| 2 | Estimated Yield Error | 5% | 8% | 7% | 8% | 10% |
| 3 | –>Range High | 52.5 | 64.8 | 58.8 | 54.0 | 49.5 |
| 4 | –>Range Low | 47.5 | 55.2 | 51.2 | 46.0 | 40.5 |
| 5 | Cumulative High | 52.5 | 117.3 | 175.8 | 229.8 | 279.3 |
| 6 | Cumulative Mean | 50.0 | 110.0 | 165.0 | 215.0 | 260 |
| 7 | Cumulative Low | 47.5 | 102.7 | 153.9 | 199.9 | 240.4 |
| 8 | Capacity Risk Level | LOW | LOW | MED | HIGH | HIGH |

Table 1 shows one example of information that can be generated in determining a georeferenced probability distribution indicative of where the grain tank 132 in machine 100 might reach its capacity. Table 1 shows the information for a single path of machine 100 that has been broken into five geographic segments along the path (e.g., along the field being harvester). The segments are identified as Seg1-Seg5 in Table 1 above.

Line 1 in Table 1 shows a value (in bushels) of the estimated or expected yield for each of the segments. This is illustratively the yield received from yield estimation system 160 and mapped to the different geographic locations by the yield and corresponding error map generator logic 168. Line 2 in Table 1 shows the estimated error corresponding to each yield value. In the example shown in Table 1, the estimated yield error is the estimated 3-Σ error for a normal distribution. Lines 3 and 4 in Table 1 show the estimated high and low yield levels for each segment. For instance, line 3 shows a high yield value which includes the estimated yield from line 1 increased by the estimated error in line 2. Line 4 shows a value that is equal to the estimated yield in line 1 decreased by the estimated yield error.

Lines 5, 6 and 7 in Table 1 show the cumulative yield (in bushels) and specifically the cumulative high yield, the cumulative mean yield and the cumulative low yield, respectively. Thus, the cumulative high yield shown in line 5, for segment 2, is the sum of the high yield values from line 3, for segments 1 and 2. The cumulative value in line 5 for segment 3 is the sum of the values for segments 1, 2 and 3 from line 3.

Line 8 in Table 1 is an indicator that indicates the probability of the clean grain tank 132 on harvesting machine 100 reaching its capacity in each of the segments 1-5 shown in Table 1. The probabilities are divided into ranges identified by the values low, medium and high. For the sake of the example shown in Table 1, the probability that the grain tank of harvesting machine 100 will reach its capacity in any given segment is low if the available capacity for the grain tank on harvesting machine 100 is greater than the cumulative high value corresponding to that segment. For instance, in segment 1, it is assumed that the local material repository (e.g., the clean grain tank 132) has a capacity of 300 bushels, and the current level in the grain tank is 130 bushels. The available capacity is thus 170 bushels. Therefore, the probability that the clean grain tank for machine 100 will reach its capacity in segment 1 is low because the available capacity of 170 bushels is greater than the cumulative high value of 52.5 bushels. The probability is the same in segment 2 because the available capacity of 170 bushels is still greater than the cumulative high of 117.3 bushels. However, in segment 3, it can be seen that the probability of the clean grain tank for harvesting machine 100 reaching its capacity is medium. This is because the cumulative mean shown in line 6 of Table 1 is less than the available capacity of 170 bushels, but the available capacity of 170 bushels is less than the cumulative high of 175.8 bushels shown for segment 3, in line 5 of Table 1.

The high probability range is defined by the available capacity being less than the cumulative mean. Therefore, segments 4 and 5 of the path represented by the information in Table 1 are assigned a high probability value because the available capacity of 170 bushels is less than the cumulative mean of 215 bushels and 260 bushels in segments 4 and 5, respectively. These representations of low, medium and high probability are examples only. Others can be used.

Generator logic 188 generates the georeferenced probability distribution of the local material repository becoming full, as shown in line 8 of Table 1, for example. For instance, it generates a probability distribution identifying different probabilities, at different geographic locations, where those probabilities are indicative of the probability that the grain tank on machine 100 will be full, at that particular geographic location. This is indicated by block 256 in the flow diagram of FIG. 3. The probabilities can be raw numeric probabilities, or they can be divided into categories or thresholds (again, as shown in line 8 of Table 1). For instance, a low probability may be indicative of a geographic location where the available capacity in the grain tank of machine 100 is greater than the cumulative high yield (the estimated yield plus an amount indicated by the expected error). Setting a low threshold to this value is indicated by block 258 in the flow diagram of FIG. 3.

A medium probability level may be indicated when the cumulative mean (e.g., that shown in line 6 of Table 1) is less than the available capacity, which is, itself, less than the cumulative high (the value shown in line 5 in Table 1). Defining a medium probability level in this way is indicated by block 260 in the flow diagram of FIG. 3.

A high probability level may be defined where the available capacity of the grain tank in machine 100 is less than the cumulative mean shown in line 6 of Table 1 above. Defining the high probability category in this way is indicated by block 262. The georeferenced probability distribution can be identified in other ways as well. This is indicated by block 264.

Path surfacing/interaction logic 190 then illustratively correlates the georeferenced probability distribution to a current position of the harvesting machine. This is indicated by block 266 in the flow diagram of FIG. 3. The current geographic location of machine 100 can be obtained from position sensor 166, or otherwise. Path surfacing/interaction logic 190 can receive other information as well, such as possible rendezvous points where hauling units may rendezvous with machine 100, to unload it. This is indicated by block 268 in the flow diagram of FIG. 3, and it is described in greater detail below with respect to FIGS. 4 and 4A. The georeferenced probability distribution can be correlated to the current position of machine 100 in other ways as well, and this is indicated by block 270.

Figure 3C:
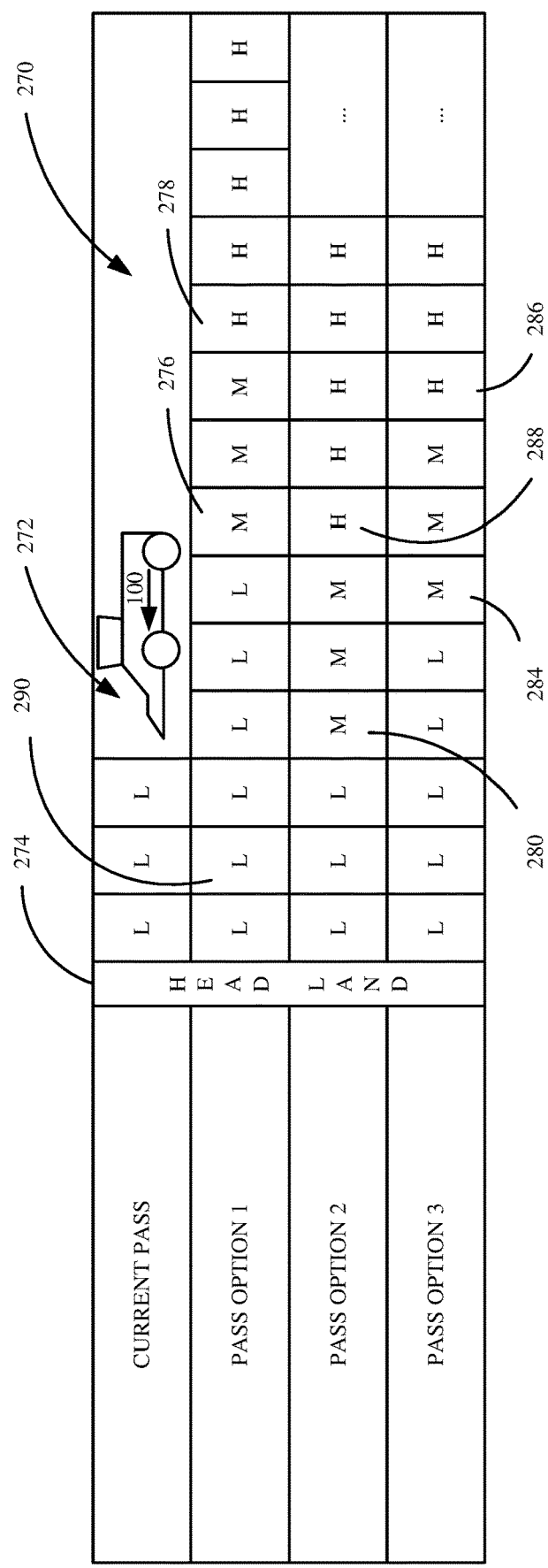
FIG. 3C is a pictorial illustration of one example of a user interface display.

FIG. 3C is one example of a user interface display 270 that can be used to surface information such as that shown in Table 1. Display 270 shows the position of machine 100, and its direction of travel, with an icon or other graphical representation 272. It is making a current pass through the field. FIG. 3 shows that a portion of the field being harvested has been divided into segments. Each segment is in a current pass, or one of three different optional passes that the machine can take after it makes a turn in the headland area graphically represented by area 274. Each cell on the display 270 represents a segment in the field. The letter in each cell represents the corresponding probability value, indicative of the probability that the clean grain tank 132 on machine 100 will be full, in that segment. Therefore, it can be seen in FIG. 3C that the machine can finish its first pass and reach the headland area 274, for a headland turn, without the probability that its grain tank 132 will reach its capacity exceeding the low level. Then, however, once the machine makes a headland turn, it can choose one of three different path options. It can be seen with the path option 1 that the machine can make a turn and continue harvesting all the way to segment 276 in the field represented by the display, before the probability that its grain tank will reach its capacity moves from the low probability level to the medium probability level. It can continue harvesting until it reaches segment 278 before that value moves to a high probability value.

However, if the machine takes path option 2, it can only harvest to segment 280 before the probability that its clean grain tank 132 will reach its capacity will switch from a low to a medium probability level. At segment 282, the probability goes to a high probability level.

With path option 3, the machine can harvest until it reaches field segment 284 before the probability reaches a medium value. It can harvest until it reaches field segment 286 before the probability that its grain tank 132 will reach its capacity changes to a high probability value.

Returning again to the flow diagram shown in FIG. 3, action threshold comparison logic 194 compares a current probability (or other value) to various action thresholds, some examples of which were described above as possibility values low, medium and high. When the value reaches an action threshold, then certain actions may be taken.

It will be noted that the action thresholds can be a wide variety of different thresholds, based upon a wide variety of different criteria. For instance, a threshold may be set that indicates a certain distance that the machine 100 is from a field segment where the probability value will change values. For instance, and again referring to FIG. 3C, assume that an action threshold has been set to indicate when the machine is less than five segments away from a field segment where the probability value changes. By way of example, assume that the distance threshold is set to five segments. Assume further that the operator of the machine takes a headland turn and begins to harvest along path option 1 in FIG. 3C. Then, when the harvester reaches the field segment 290, action threshold comparison logic 194 may be triggered to take some action, because the machine is now within 5 field segments of its probability value changing from low to medium.

The thresholds can take a wide variety of other forms as well. For instance, the threshold may be set to a value corresponding to a point where the probability value actually does change. That threshold would be met, for example, when machine 100 moves from a field segment corresponding to probability value of low to an adjacent field segment corresponding to a probability value of medium or, where it moves from a field segment corresponding to a probability value of medium to an adjacent field segment where the corresponding probability value is high. The threshold can be set to identify a certain distance from a headland turn (so that the operator has adequate opportunity to select his or her next pass through the field), or it can be set based on time, such as a certain time before the probability that its grain tank is full moves to a next highest probability value. The threshold can be set in a wide variety of other ways as well. Determining whether an action threshold has been reached is indicated by block 292 in the flow diagram of FIG. 3.

When an action threshold has been reached, action threshold comparison logic 194 indicates this to control signal generator 176. Control signal generator 176 then generates one or more control signals to control one or more controllable subsystems 178 based upon the particular action threshold that has been reached. Generating control signals under these circumstances is indicated by block 294 in the flow diagram of FIG. 3.

Control signal generator 176 can generator control signals in a wide variety of different ways. For instance, it can generate different control signals based upon a variety of different action thresholds and desired responses. This is indicated by block 296. By way of example, if the harvesting machine 100 has entered a segment where the probability that its grain tank will reach its capacity is high, then control signal generator 176 may generate a control signal to control operator interface logic 204 to sound an alarm or to otherwise generate an alarm output for operator 183. Or, under those circumstances, control signal generator 176 may generate a control signal to control propulsion subsystem 198 to stop harvesting machine 100 so that the grain tank does not overflow, or to wait for a haulage unit, or to wait until operator 183 overrides that command. However, if the machine 100 has entered a segment where the probability has raised from low to medium, then a display may be generated, but without an alarm. Similarly, if harvester 100 is in a segment where the probability is low, then control signal generator 176 may control the controllable subsystems 178 so that a simple display is generated, or so that no display is generated.

Control signal generator 176 may control steering subsystem 200 to steer machine 100 based upon the action threshold that was crossed. For instance, if a haulage unit is currently available, or will soon be available, to unload machine 100, then control signal generator 176 may generate steering control signals to control steering subsystem 200 so that the machine 100 takes machine path 2 shown in FIG. 3C. However, if a haulage unit is not presently available, and may not be available for some time, then control signal generator 176 may generate control signals to control steering subsystem 200 to take path option 1 shown in FIG. 3C. This will delay the time when the clean grain tank on machine 100 will likely be full. This will give the haulage unit time to reach machine 100. Controlling the steering actuator, or steering subsystem 200 is indicated by block 298 in the flow diagram of FIG. 3.

Where the action threshold indicates a distance or time from a position where the probability value will increase, then control signal generator 176 may control propulsion subsystem 198 to decrease the speed, or to increase the speed of machine 100. For instance, if the estimated yield values for a certain portion of the field have fallen, this may indicate that machine 100 can increase its speed, because the next field segment where the probability that its grain tank will be full increases is a relatively large distance from its current location. Similarly, if the yield has increased, then control signal generator 176 may generate control signals to control propulsion subsystem 198 to reduce the speed of machine 100, so that the time before its grain tank is likely going to be at is capacity is increased. This may be done in order to give a haulage unit extra time to reach machine 100 so that machine 100 can continue harvesting, without stopping and remaining idle to wait for a haulage unit. Controlling the speed actuator or propulsion subsystem is indicated by block 300 in the flow diagram of FIG. 3.

Control signal generator 176 can control operator interface logic 204 to control various operator interface mechanisms 180. As discussed above, this can include generating a display (such as that shown in FIG. 3C), generating an alarm, generating audible, visual, or haptic outputs, as well as receiving operator inputs through operator interface mechanisms 180. Generating control signals to control operator interface logic 204 and operator interface mechanisms 180 is indicated by block 302 in the flow diagram of FIG. 3.

Control signal generator 176 can also generate control signals to control communication subsystem 202. This is indicated by block 304 in the flow diagram of FIG. 3. For instance, it may be that machine 100 has crossed the threshold to indicate that it is now in a field segment where it is highly probable that its grain tank will reach capacity. In that case, control signal generator 176 can automatically generate control signals to control communication subsystem 202 to send a message to a haulage unit (such as the driver of a tractor pulling one or more grain carts) that machine 100 is about to have a full grain tank. It can control communication subsystem 202 to communicate with a site manager or farm manager or with a semi-driver, or with other remote machines and people as well.

Control signal generator 176 can also illustratively generate control signals that are communicated using communication subsystem 202 to communicate with or control other machines. For instance, the control signals may generate a display or other alert in the operator compartment of a haulage unit indicating that the harvester needs haulage attention. It can provide a most direct route (or an otherwise preferred route) from the haulage unit's current location to the location of machine 100. It can automatically control the haulage unit to follow that route. By automatic it is meant that the operation or function can be carried out without further operator involvement except, perhaps, to authorize or initiate the function. Controlling and communicating with other machines is indicated by block 306 in the flow diagram of FIG. 3. Control signal generator 176 can generate a wide variety of other control signals, based upon the action threshold that has been reached. This is indicated by block 308.

In one example, this type of operation continues on machine 100 until the harvesting operation is complete, as indicated by block 310. If the harvesting operation is not complete, then the harvester may wait for a pre-determined time period, or may travel a specified distance, or may wait for other criteria to occur, and then return to processing at block 226, where information is received or obtained in order to update the georeferenced probability distribution map. This is indicated by block 312.

Figure 4:
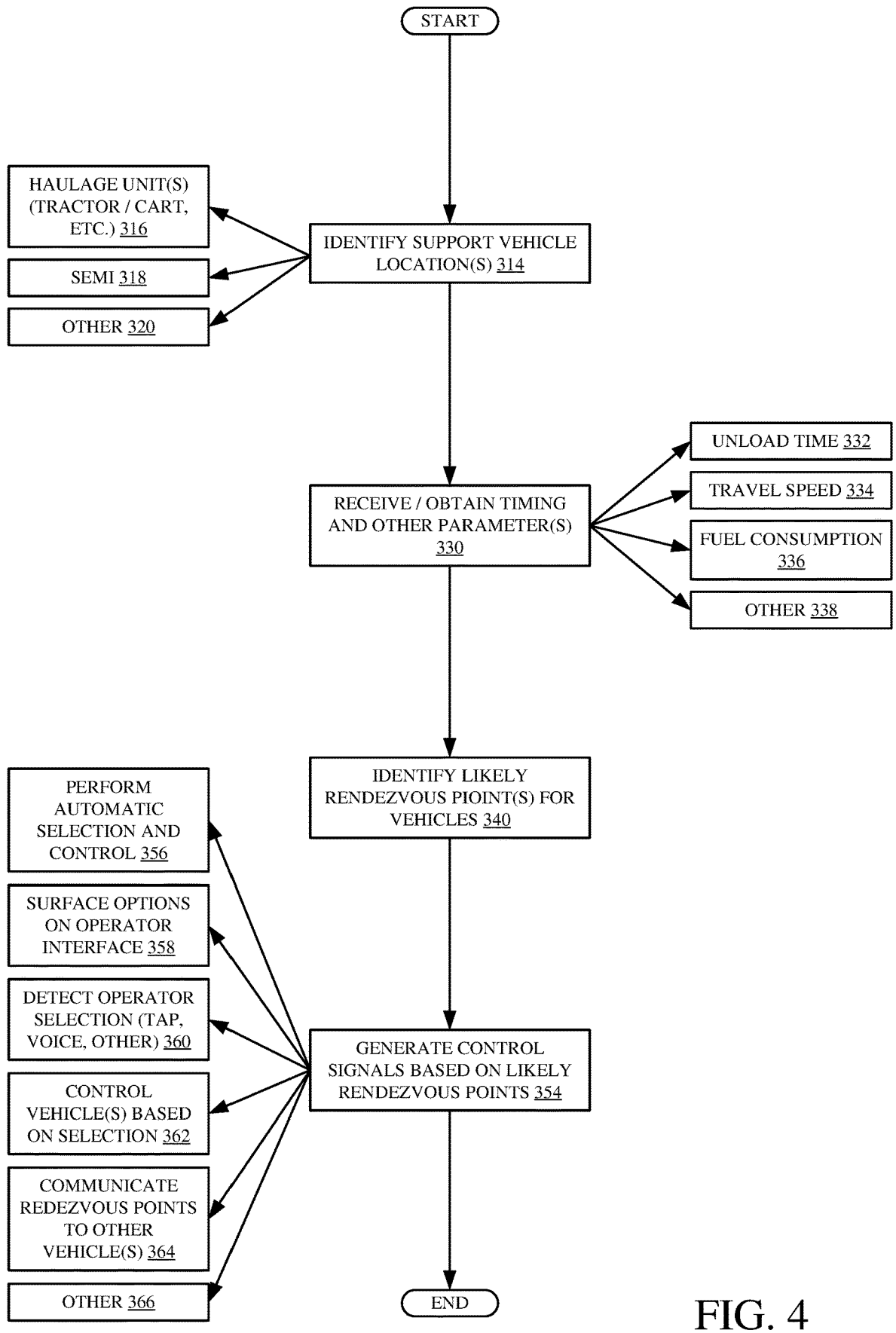
FIG. 4 is a flow diagram illustrating one example of the operation of a path processing system in an agricultural harvesting machine.

FIG. 4 is a flow diagram showing one example of the operation of machine 100 and path processing system 174 in not only identifying a plurality of different possible paths of machine 100 through a field, and the corresponding georeferenced probability distribution, but also identifying potential rendezvous points where a haulage unit (such as a tractor pulling one or more grain carts) may rendezvous with machine 100 to unload it. Control signal generator 176 first controls communication subsystem 202 to identify the locations of any support vehicles that are supporting harvester 100 in the field being harvested. This is indicated by block 314 in the flow diagram of FIG. 4. It can identify the positions, for instance, of various different haulage units (tractor/grain cart combinations). This is indicated by block 316. It can identify the location of a semi or other transport truck as indicated by block 318, and it can identify the locations of any of a wide variety of other vehicles. This is indicated by block 320.

Figure 4A:
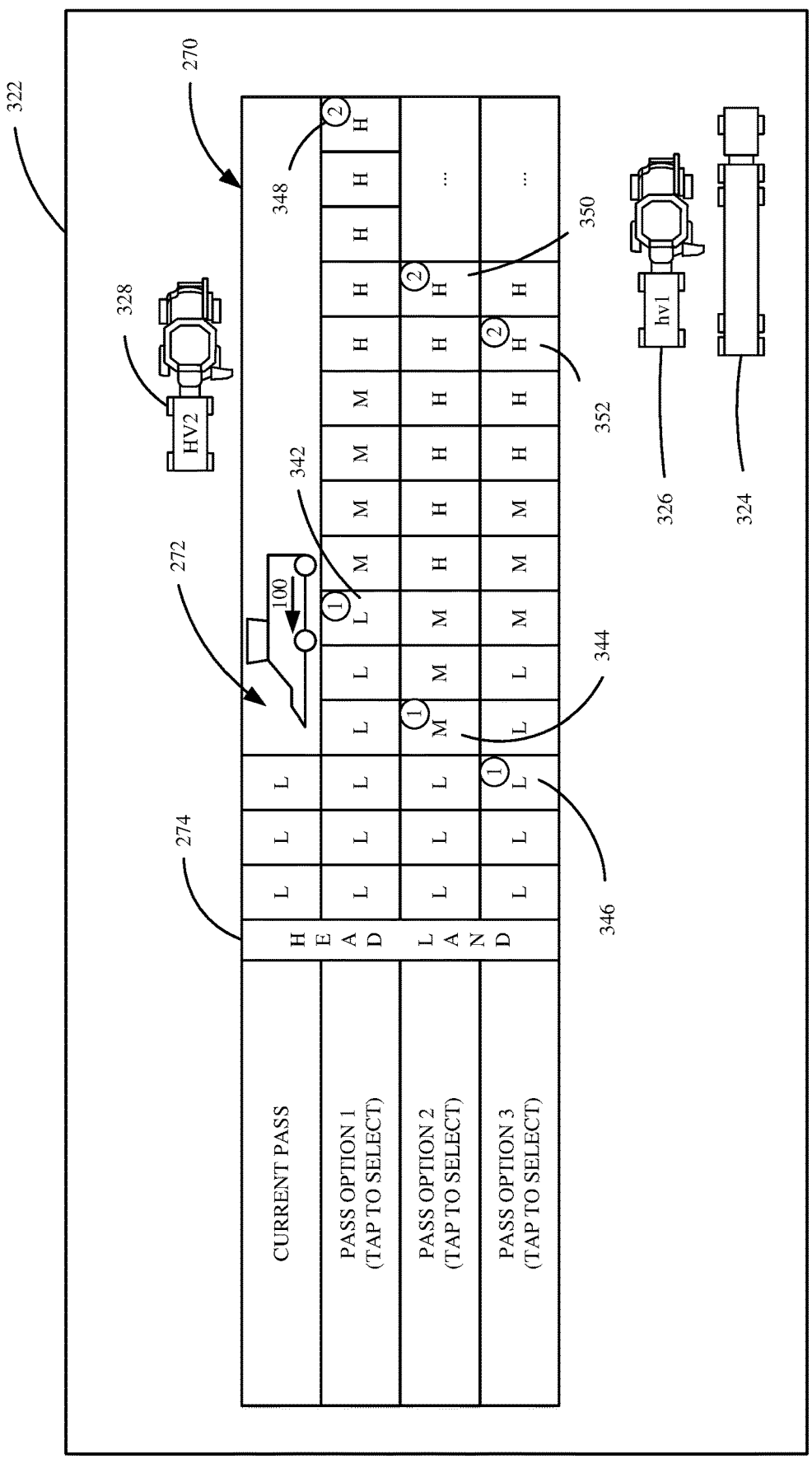
FIG. 4A is a pictorial illustration showing one example of a user interface display.

FIG. 4A shows one example of a user interface display 322 indicating some of these items. User interface display 322 has some items that are similar to the user interface display 270, shown in FIG. 3C, and similar items are similarly numbered. However, it can be seen in FIG. 4A that display 322 also shows a position of a semi-truck 324, a first haulage unit or haulage vehicle 326 and the position of a second haulage unit or haulage vehicle 328. In one example, the locations of vehicles 324-328 are shown relative to the icon 272 representing harvester 100. Also, the graphical illustrations of vehicles 326 and 328 may indicate their status (such as whether they are full, or empty). By way of example, the lowercase letters identified on haulage vehicle 326 ("hv1") may indicate that it is empty. The uppercase letters on haulage vehicle ("HV2") may indicate that it is full. The fill statuses can be indicated in a wide variety of other ways as well.

Control signal generator 176 may control communication subsystem 202 to receive or obtain other information, such as timing and other parameter information from the various vehicles. This is indicated by block 330 in the flow diagram of FIG. 4. For instance, it may receive an indication from vehicles 326 and/or 328 indicating an unload time, which identifies a time that will be needed for the vehicle to unload its grain into semi 324 or elsewhere (which may be based on historic values or an estimate, knowing the size of the cart, the characteristics of the unloading mechanism, etc.). This is indicated by block 332. It may receive information indicative of the travel speed of vehicles 326 and 328, which may indicate how long it will take those vehicles to reach semi 324 and to return to the various locations on the field being harvested by harvester 100. Receiving an indication of the travel speed is indicated by block 334 in FIG. 4. The communication subsystem 202 may be controlled to receive information indicative of the fuel consumption of haulage units or vehicles 326 and 328. This may be the rate of fuel consumption, estimated fuel consumption to reach a location (such as to travel to semi 324 and back to various locations) on the field being harvested by harvester 100, or other information. Receiving fuel consumption parameters is indicated by block 336 in the flow diagram of FIG. 4. Communication subsystem 202 can receive a wide variety of other timing information or parameters as well. This is indicated by block 338.

Rendezvous point identifier logic 185 identifies likely rendezvous points for vehicles 326 and 328 with harvester 100. This is indicated by block 340 in the flow diagram of FIG. 4. The likely rendezvous points are determined based upon the location of the vehicles and the various timing and parameter information received at block 330. By way of example, in the user interface display illustrated in FIG. 4A, the "1" indicates where haulage vehicle hv1 (326) will be able to meet harvester 100 in the corresponding path. For instance, if harvester 100 makes a headland turn in headland area 274 and chooses to harvest along path option 1, the haulage vehicle 1 (326) can rendezvous with harvester 100 in field segment 342. This means that rendezvous point identifier logic 185 has calculated that haulage vehicle hv1 (326) can finish unloading at semi 324, travel to the headland area 274 in the left of the field being harvested, and then catch up to harvesting machine 100 (as it is traveling left to right along path option 1 in the field) at field segment 324. Similarly, if machine 100 chooses path option 2, then haulage vehicle 1 (326) will catch up to it at field segment 344. If harvester 100 begins harvesting in path option 3, then haulage vehicle 1 (326) will catch up to it at field segment 346.

By contrast, haulage vehicle 2 (328) needs to travel all the way back to semi 324, and unload before it is available to travel back to the harvester 100. Therefore, it is not able to rendezvous with harvester 100 until harvester 100 reaches field segment 348 (in path option 1), field segment 350 (in path option 2) and field segment 352 (in path option 3).

Uncertainty estimator 187 may identify rendezvous points 342-352 with an estimated uncertainty level. The uncertainty may be influenced by the topography of the field, by the certainty with which logic 185 knows the estimated speed at which the vehicle will be traveling, the weather, the soil conditions, among other things. Therefore, it may be that display 322 displays the rendezvous points (e.g., the "1" and "2") in varying colors indicative of how certain the rendezvous points are to be correct. For instance, if they are displayed in red, this may indicate a lowest probability that the rendezvous point is correct (or lowest confidence) whereas if they are displayed in green, this may indicate a highest probability that the rendezvous points are correct (or highest confidence).

Once the rendezvous points are identified, then control signal generator 176 illustratively generates control signals based upon the likely rendezvous points. This is indicated by block 354 in the flow diagram of FIG. 4. By way of example, control signal generator 176 can generate control signals to perform automatic selection of a particular path option, and control machine 100 to move along that path option. This is indicated by block 356. For instance, it may be that control signal generator 176 generates control signals to control propulsion subsystem 198 and steering subsystem 200 to control machine 100 to travel along path option 3, because it is most likely that haulage vehicle 1 (326) will be able to receive grain from machine 100 before it is full. In another example, however, it may be that control signal generator 176 controls propulsion subsystem 198 and steering subsystem 200 to control machine 100 to take path option 1 because that is the path that allows machine 100 to get as full as possible before the haulage vehicle arrives. Control signal generator 176 can control propulsion subsystem 198 and steering subsystem 200 to cause combine 100 to select a next pass after reaching headland area 274 based on different criteria. In one example, it may select the next pass as the one with the earliest fill point (e.g., where the georeferenced probability distribution indicates that the combine will likely reach its fill capacity earliest in the pass). In another example, it may choose the pass with the latest fill point. It may choose the pass that has a best rendezvous with a moving haulage vehicle (e.g., where the haulage vehicle is most likely to reach harvester 100 before its grain tank is full). It may also choose a pass where the most likely fill point is closest to a fixed haulage vehicle (e.g., where it is closest to a truck parked in the headlands area 274 or elsewhere). These and other examples as well as other criteria are contemplated herein.

In another example, control signal generator 176 can control operator interface logic 204 to surface the path options and corresponding rendezvous points on an operator interface mechanism 180 for interaction by operator 183. As is shown in the example illustrated in FIG. 4A, each of the path options 1-3 may be actuatable so that operator 183 can select one of the path options by simply tapping on that actuator. If the user taps on the actuator, then control signal generator 176 detects this and generates control signals to again control the propulsion subsystem 198 and steering subsystem 200 to control machine 100 to travel down the selected path option. Surfacing the options on an operator interface is indicated by block 358 in the flow diagram of FIG. 4, and detecting operator selection of one of the options is indicated by block 360. Automatically controlling the vehicle based upon the selected path option is indicated by block 362. The path option can be selected in other ways as well, such as using a voice command, a point and click device, or in other ways.

It will also be noted that, in one example, control signal generator 176 can generate control signals to control communication subsystem 202 to communicate the rendezvous points to other vehicles. This is indicated by block 364 in the flow diagram of FIG. 4. By way of example, it may be that communication subsystem 202 is controlled to communicate the geographic location of a desired rendezvous point to haulage vehicle 1 (326) so that its operator can move to that rendezvous point as quickly as possible. It may be that the rendezvous point can be communicated to the navigation system in the haulage vehicle so that it automatically proceeds to the rendezvous point on the path option selected by the operator 183 or harvester 100.

Control signal generator 176 can generate control signals to controllable subsystems 178 in a wide variety of other ways as well. This is indicated by block 366.

While the present discussion has proceeded with respect to a harvester, it can be used with other machines that collect or distribute material as well. Where the machine distributes material, the description is similar except that instead of generating a georeferenced possibility distribution of where the material repository will be full, it will represent the probability distribution of where the material repository will be empty.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
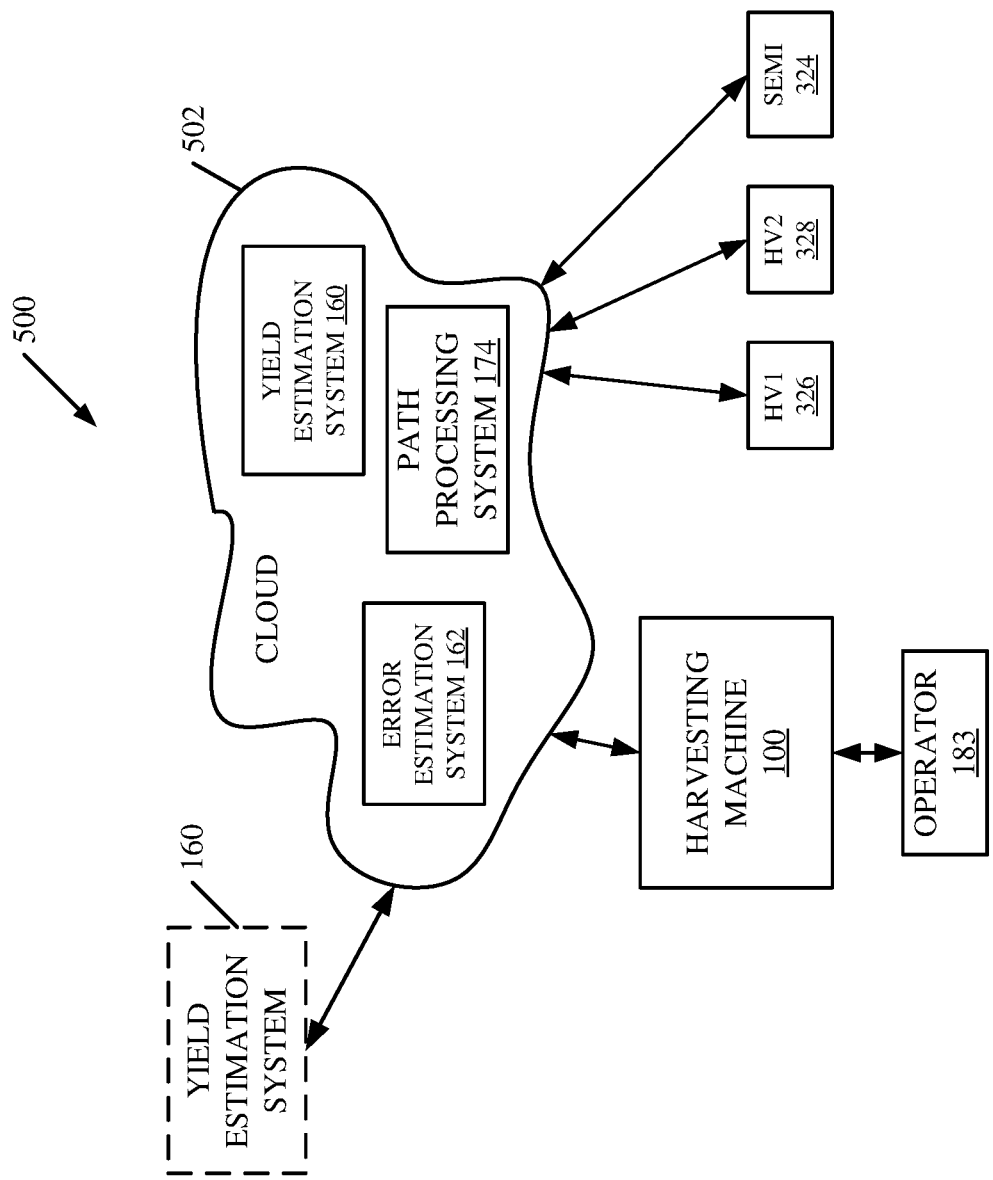
FIG. 5 is a block diagram showing one example of a harvesting machine deployed in a remote server environment.

FIG. 5 is a block diagram of harvester 100, shown in FIG. 2, except that it communicates with elements in a remote server architecture 500. In an example embodiment, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 2 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 5, some items are similar to those shown in FIG. 2 and they are similarly numbered. FIG. 5 specifically shows that path processing system 174, yield estimation system 160 and error estimation system 162 can be located at a remote server location 502. Therefore, harvester 100 accesses those systems through remote server location 502.

FIG. 5 also depicts another example of a remote server architecture. FIG. 5 shows that it is also contemplated that some elements of FIG. 2 are disposed at remote server location 502 while others are not. By way of example, field estimation system 160 or other systems or logic can be disposed at a location separate from location 502, and accessed through the remote server at location 502. Regardless of where they are located, they can be accessed directly by harvester 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
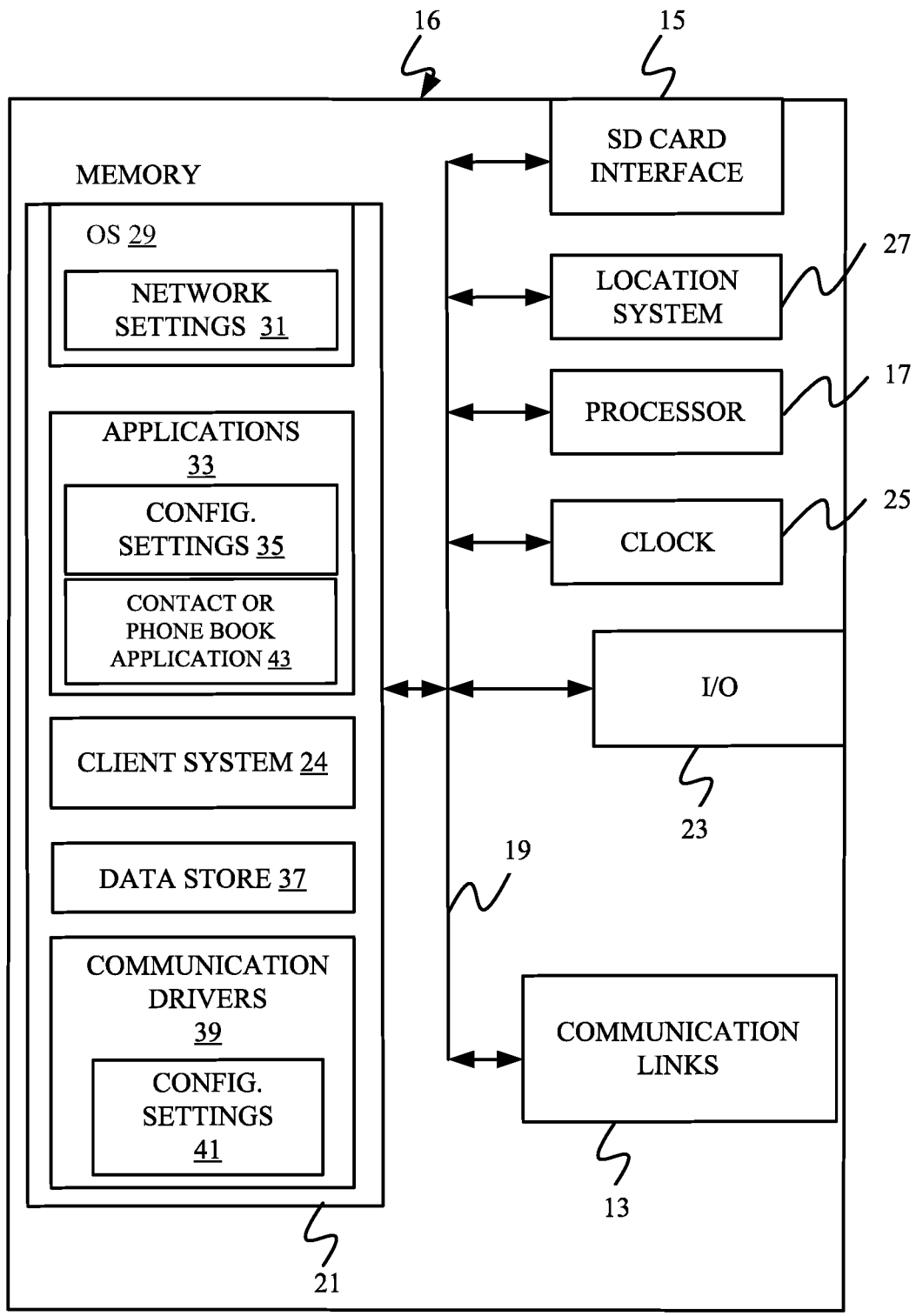
FIGS. 6-8 show examples of mobile devices that can be used in the architectures shown in the previous figures.
Figure 7:
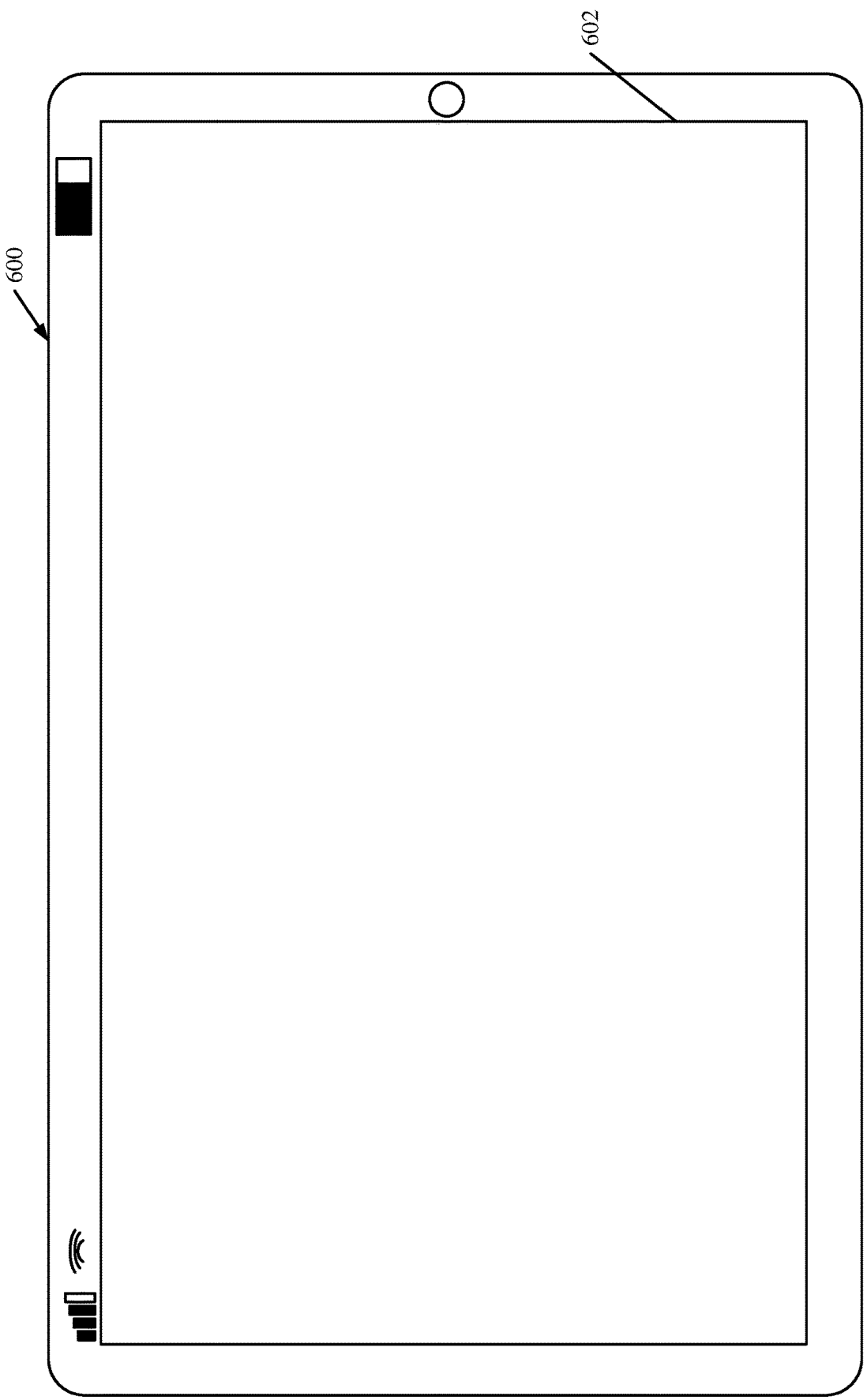
Figure 8:
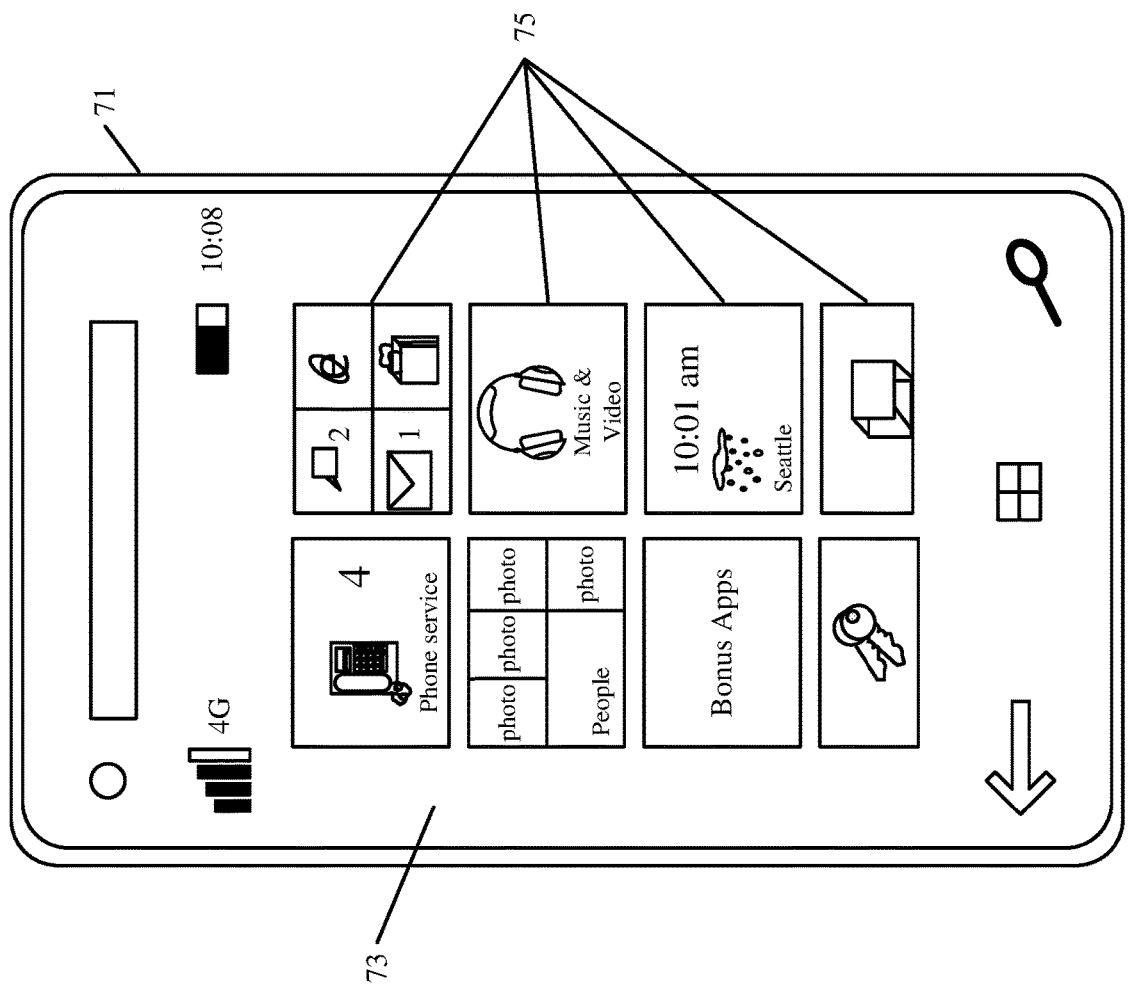

FIG. 6 is a simplified block diagram of one illustrative embodiment of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the stool width and position data. FIGS. 7-8 are examples of handheld or mobile devices.

FIG. 6 provides a general block diagram of the components of a client device 16 that can run some components shown in FIG. 2, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one example in which device 16 is a tablet computer 600. In FIG. 7, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
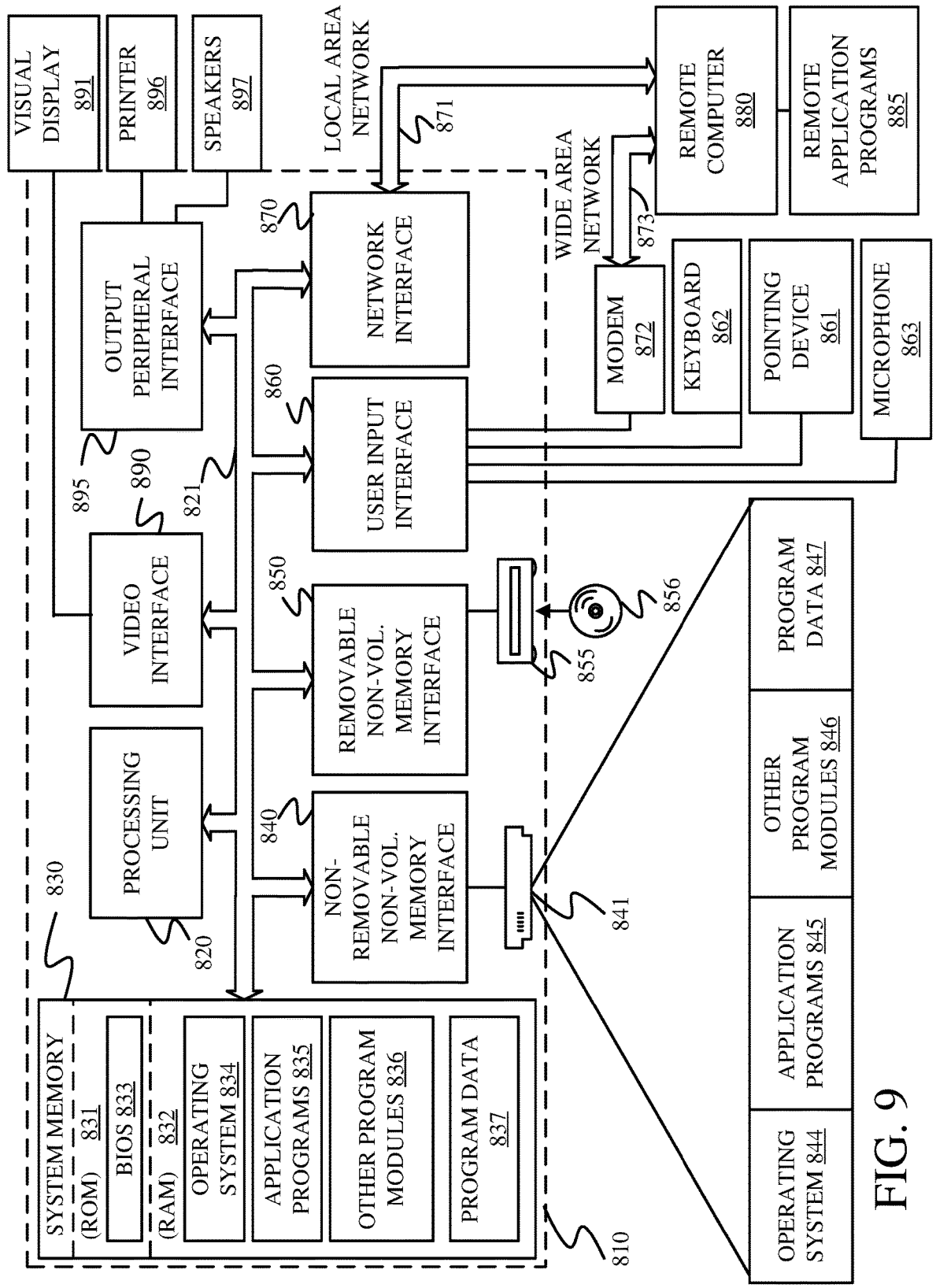
FIG. 9 is a block diagram showing one example of a computing environment that can be used in the architectures shown in the previous figures.

FIG. 9 is one example of a computing environment in which elements of FIG. 2, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors from pervious FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an agricultural harvesting machine, comprising:

a harvested crop repository having a fill capacity;

crop processing functionality that engages crop in a field and processes the crop and moves the processed crop to the harvested crop repository;

a current fill level sensor that senses a fill variable indicative of a current fill level of the harvested crop repository and generates a fill level signal indicative of the current fill level;

a path processing system that receives the fill level signal and a predicted crop yield at a plurality of different field segments along a harvester path and that generates a georeferenced probability distribution indicative of a probability that the harvested crop repository will reach the fill capacity in the different field segments along the harvester path;

a controllable subsystem; and a control signal generator that generates a control signal to control the controllable subsystem based on the georeferenced probability distribution.

Example 2 is the agricultural harvesting machine of any or all previous examples and further comprising:

yield and corresponding map generation logic configured to receive a georeferenced yield estimation for the field segments and a corresponding error estimation indicative of an error estimate for the yield estimation and to generate a yield and corresponding error map indicative of the predicted crop yield and corresponding error estimate at each of the plurality of different field segments.

Example 3 is the agricultural harvesting machine of any or all previous examples wherein the controllable subsystem comprises:

a propulsion system configured to propel the agricultural harvesting machine and wherein the control signal generator generates the control signal to control the propulsion system to control a speed at which the agricultural harvesting machine travels along the harvester path.

Example 4 is the agricultural harvesting machine of any or all previous examples wherein the path processing system comprises:

possible path generator logic configured to identify a plurality of different possible harvester paths;

Example 5 is the agricultural harvesting machine of any or all previous examples wherein the path processing system comprises:

cumulative yield per path identifier logic configured to identify a cumulative predicted crop yield at a plurality of different field segments along each of the plurality of different possible harvester paths.

Example 6 is the agricultural harvesting machine of any or all previous examples wherein the path processing system comprises:

georeferenced probability distribution generator logic configured to generate a different georeferenced probability distribution, indicative of a probability that the harvested crop repository will reach the fill capacity in the different field segments, along each of the plurality of different harvester paths based on the cumulative predicted crop yield.

Example 7 is the agricultural harvesting machine of any or all previous examples wherein the controllable subsystem comprises:

a steering system configured to steer the agricultural harvesting machine and wherein the control signal generator generates the control signal to control the steering system to control a direction of the agricultural harvesting machine to steer the agricultural harvesting machine along one of the plurality of different harvester paths.

Example 8 is the agricultural harvesting machine of any or all previous examples wherein the path processing system comprises:

rendezvous point identifier logic configured to identify a rendezvous point for the agricultural harvesting machine and a haulage vehicle and wherein the control signal generator generates the control signal based on the georeferenced probability distribution and the rendezvous point.

Example 9 is the agricultural harvesting machine of any or all previous examples wherein the rendezvous point identifier logic identifies a location and fill status of the haulage vehicle and estimates the rendezvous point along the harvester path based on the location of the haulage vehicle and the fill status.

Example 10 is the agricultural harvesting machine of any or all previous examples wherein the path processing system comprises:

rendezvous point identifier logic configured to identify a plurality of different rendezvous points for the agricultural harvesting machine and each of a plurality of different haulage vehicles and wherein the control signal generator generates the control signal based on the georeferenced probability distribution and the rendezvous points.

Example 11 is the agricultural harvesting machine of any or all previous examples wherein the rendezvous point identifier logic identifies a location and fill status of each of the plurality of different haulage vehicles and estimates the rendezvous point along the harvester path based on the location and fill statuses of each of the plurality of different haulage vehicles.

Example 12 is the agricultural harvesting machine of any or all previous examples wherein the controllable subsystem comprises:

a communication system, the control signal generator generating the control signal to control the communication system to communicate the rendezvous point to one of the plurality of different haulage vehicles.

Example 13 is the agricultural harvesting machine of any or all previous examples wherein the controllable subsystem comprises:

an operator interface mechanism, wherein the control signal generator generates the control signal to control the operator interface mechanism based on the georeferenced probability distribution.

Example 14 is a method of controlling a mobile work machine, comprising:

engaging material at a worksite;

processing the material and moving the processed material to the material repository;

sensing a fill variable indicative of a current fill level of the material repository;

generating a fill level signal indicative of the current fill level;

receiving a predicted material recovery at a plurality of different worksite segments along a machine path;

generating a georeferenced probability distribution indicative of a probability that the material repository will reach the fill capacity in the different worksite segments along the machine path; and generating a control signal to control a controllable subsystem based on the georeferenced probability distribution.

Example 15 is the method of any or all previous examples wherein the controllable subsystem comprises a propulsion system configured to propel the mobile work machine and wherein generating a control signal comprises:

generating the control signal to control the propulsion system to control a speed at which the mobile work machine travels along the machine path.

Example 16 is the method of any or all previous examples wherein generating a georeferenced probability distribution comprises:

identify a plurality of different possible machine paths;

identifying a cumulative material recovery at a plurality of different worksite segments along each of the plurality of different possible machine paths; and generating a different georeferenced probability distribution, indicative of a probability that the material repository will reach the fill capacity in the different worksite segments, along each of the plurality of different machine paths based on the cumulative predicted crop yield.

Example 17 is the method of any or all previous examples wherein generating the control signal comprises:

generating the control signal to control a steering system to control a direction of the mobile work machine to steer the mobile work machine along one of the plurality of different machine paths.

Example 18 is the method of any or all previous examples and further comprising:

identifying a rendezvous point for the mobile work machine and a haulage vehicle and wherein generating the control signal comprises generating the control signal based on the georeferenced probability distribution and the rendezvous point.

Example 19 is the method of any or all previous examples wherein identifying a rendezvous point comprises:

identifying a plurality of different rendezvous points for the mobile work machine and each of a plurality of different haulage vehicles and wherein generating the control signal comprises generating the control signal based on the georeferenced probability distribution and the rendezvous points.

Example 20 is a mobile work machine, comprising:

a material repository having a fill capacity;

material processing functionality that engages material in a worksite and processes the material and moves the processed material to the material repository;

a current fill level sensor that senses a fill variable indicative of a current fill level of the material repository and generates a fill level signal indicative of the current fill level;

a path processing system that receives the fill level signal and a predicted material recovery at a plurality of different worksite segments along a machine path and that generates a georeferenced probability distribution indicative of a probability that the material repository will reach the fill capacity in the different worksite segments along the machine path;

a controllable subsystem; and a control signal generator that generates a control signal to control the controllable subsystem based on the georeferenced probability distribution.

Example 21 is an agricultural distribution machine, comprising:

a material repository having a fill capacity indicative of a capacity of the repository to hold material to be distributed;

material distribution functionality that receives the material from the material repository and distributes the material onto a worksite;

a current fill level sensor that senses a fill variable indicative of a current fill level of the material repository and generates a fill level signal indicative of the current fill level;

a path processing system that receives the fill level signal and a predicted distribution rate at a plurality of different field segments along a machine path and that generates a georeferenced probability distribution indicative of a probability that the material repository will be empty in the different field segments along the machine path;

a controllable subsystem; and a control signal generator that generates a control signal to control the controllable subsystem based on the georeferenced probability distribution.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural harvesting machine, comprising:
   a harvested crop repository having a fill capacity;
   crop processing functionality that engages crop in a field and processes the crop and moves the processed crop to the harvested crop repository;
   a current fill level sensor that senses a fill variable indicative of a current fill level of the harvested crop repository and generates a fill level signal indicative of the current fill level;
   a path processing system that receives the fill level signal and a predicted crop yield at a plurality of different field segments along a harvester path and that generates a georeferenced probability distribution indicative of a probability that the harvested crop repository will reach the fill capacity in the different field segments along the harvester path;
   a controllable subsystem; and
   a control signal generator that generates a control signal to control the controllable subsystem based on the georeferenced probability distribution.

2. The agricultural harvesting machine of claim 1 and further comprising:
   yield and corresponding map generation logic configured to receive a georeferenced yield estimation for the field segments and a corresponding error estimation indicative of an error estimate for the yield estimation and to generate a yield and corresponding error map indicative of the predicted crop yield and corresponding error estimate at each of the plurality of different field segments.

3. The agricultural harvesting machine of claim 1 wherein the controllable subsystem comprises:
   a propulsion system configured to propel the agricultural harvesting machine and wherein the control signal generator generates the control signal to control the propulsion system to control a speed at which the agricultural harvesting machine travels along the harvester path.

4. The agricultural harvesting machine of claim 2 wherein the path processing system comprises:

possible path generator logic configured to identify a plurality of different possible harvester paths.

5. The agricultural harvesting machine of claim 4 wherein the path processing system comprises:
   cumulative yield per path identifier logic configured to identify a cumulative predicted crop yield at a plurality of different field segments along each of the plurality of different possible harvester paths.

6. The agricultural harvesting machine of claim 5 wherein the path processing system comprises:
   georeferenced probability distribution generator logic configured to generate a different georeferenced probability distribution, indicative of a probability that the harvested crop repository will reach the fill capacity in the different field segments, along each of the plurality of different harvester paths based on the cumulative predicted crop yield.

7. The agricultural harvesting machine of claim 6 wherein the controllable subsystem comprises:
   a steering system configured to steer the agricultural harvesting machine and wherein the control signal generator generates the control signal to control the steering system to control a direction of the agricultural harvesting machine to steer the agricultural harvesting machine along one of the plurality of different harvester paths.

8. The agricultural harvesting machine of claim 1 wherein the path processing system comprises:
   rendezvous point identifier logic configured to identify a rendezvous point for the agricultural harvesting machine and a haulage vehicle and wherein the control signal generator generates the control signal based on the georeferenced probability distribution and the rendezvous point.

9. The agricultural harvesting machine of claim 8 wherein the rendezvous point identifier logic identifies a location and fill status of the haulage vehicle and estimates the rendezvous point along the harvester path based on the location of the haulage vehicle and the fill status.

10. The agricultural harvesting machine of claim 9 wherein the path processing system comprises:
    rendezvous point identifier logic configured to identify a plurality of different rendezvous points for the agricultural harvesting machine and each of a plurality of different haulage vehicles and wherein the control signal generator generates the control signal based on the georeferenced probability distribution and the rendezvous points.

11. The agricultural harvesting machine of claim 10 wherein the rendezvous point identifier logic identifies a location and fill status of each of the plurality of different haulage vehicles and estimates the rendezvous point along the harvester path based on the location and fill statuses of each of the plurality of different haulage vehicles.

12. The agricultural harvesting machine of claim 11 wherein the controllable subsystem comprises:
    a communication system, the control signal generator generating the control signal to control the communication system to communicate the rendezvous point to one of the plurality of different haulage vehicles.

13. The agricultural harvesting machine of claim 1 wherein the controllable subsystem comprises:
    an operator interface mechanism, wherein the control signal generator generates the control signal to control the operator interface mechanism based on the georeferenced probability distribution.

14. A method of controlling a mobile work machine, comprising:
- engaging material at a worksite;
- processing the material and moving the processed material to the material repository;
- sensing a fill variable indicative of a current fill level of the material repository;
- generating a fill level signal indicative of the current fill level;
- receiving a predicted material recovery at a plurality of different worksite segments along a machine path;
- generating a georeferenced probability distribution indicative of a probability that the material repository will reach the fill capacity in the different worksite segments along the machine path; and
- generating a control signal to control a controllable subsystem based on the georeferenced probability distribution.

15. The method of claim 14 wherein the controllable subsystem comprises a propulsion system configured to propel the mobile work machine and wherein generating a control signal comprises:
- generating the control signal to control the propulsion system to control a speed at which the mobile work machine travels along the machine path.

16. The method of claim 15 wherein generating a georeferenced probability distribution comprises:
- identify a plurality of different possible machine paths;
- identifying a cumulative material recovery at a plurality of different worksite segments along each of the plurality of different possible machine paths; and
- generating a different georeferenced probability distribution, indicative of a probability that the material repository will reach the fill capacity in the different worksite segments, along each of the plurality of different machine paths based on the cumulative predicted crop yield.

17. The method of claim 16 wherein generating the control signal comprises:
- generating the control signal to control a steering system to control a direction of the mobile work machine to steer the mobile work machine along one of the plurality of different machine paths.

18. The method of claim 14 and further comprising:
- identifying a rendezvous point for the mobile work machine and a haulage vehicle and wherein generating the control signal comprises generating the control signal based on the georeferenced probability distribution and the rendezvous point.

19. The method of claim 18 wherein identifying a rendezvous point comprises:
- identifying a plurality of different rendezvous points for the mobile work machine and each of a plurality of different haulage vehicles and wherein generating the control signal comprises generating the control signal based on the georeferenced probability distribution and the rendezvous points.

20. A mobile work machine, comprising:
- a material repository having a fill capacity;
- material processing functionality that engages material in a worksite and processes the material and moves the processed material to the material repository;
- a current fill level sensor that senses a fill variable indicative of a current fill level of the material repository and generates a fill level signal indicative of the current fill level;
- a path processing system that receives the fill level signal and a predicted material recovery at a plurality of different worksite segments along a machine path and that generates a georeferenced probability distribution indicative of a probability that the material repository will reach the fill capacity in the different worksite segments along the machine path;
- a controllable subsystem; and
- a control signal generator that generates a control signal to control the controllable subsystem based on the georeferenced probability distribution.

21. An agricultural distribution machine, comprising:
- a material repository having a fill capacity indicative of a capacity of the repository to hold material to be distributed;
- material distribution functionality that receives the material from the material repository and distributes the material onto a worksite;
- a current fill level sensor that senses a fill variable indicative of a current fill level of the material repository and generates a fill level signal indicative of the current fill level;
- a path processing system that receives the fill level signal and a predicted distribution rate at a plurality of different field segments along a machine path and that generates a georeferenced probability distribution indicative of a probability that the material repository will be empty in the different field segments along the machine path;
- a controllable subsystem; and
- a control signal generator that generates a control signal to control the controllable subsystem based on the georeferenced probability distribution.

* * * * *